US008812555B2

(12) United States Patent
Larson et al.

(10) Patent No.: US 8,812,555 B2
(45) Date of Patent: Aug. 19, 2014

(54) DYNAMIC LOCK-FREE HASH TABLES

(75) Inventors: Per-Ake Larson, Redmond, WA (US); Donghui Zhang, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 114 days.

(21) Appl. No.: 13/163,674

(22) Filed: Jun. 18, 2011

(65) Prior Publication Data

US 2012/0323970 A1  Dec. 20, 2012

(51) Int. Cl.
*G06F 17/30* (2006.01)

(52) U.S. Cl.
USPC ......................................... 707/800; 707/747

(58) Field of Classification Search
USPC ................................................ 707/800, 747
See application file for complete search history.

(56) References Cited

U.S. PATENT DOCUMENTS

| | | | |
|---|---|---|---|
| 6,360,220 B1 | 3/2002 | Forin | |
| 6,578,131 B1 | 6/2003 | Larson et al. | |
| 6,988,180 B2 | 1/2006 | Kadatch | |
| 7,370,054 B1* | 5/2008 | Martin et al. | 707/747 |
| 7,409,526 B1 | 8/2008 | Ng et al. | |
| 7,702,628 B1 | 4/2010 | Luchangco et al. | |
| 2010/0257181 A1 | 10/2010 | Zhou et al. | |
| 2012/0036134 A1* | 2/2012 | Malakhov | 707/747 |

OTHER PUBLICATIONS

Michael, Maged M., "High Performance Dynamic Lock-Free Hash Tables and List-Based Sets", Retrieved Jan. 18, 2011 at <<http://www.research.ibm.com/people/m/michael/spaa-2002.pdf>>, Proceedings of the fourteenth annual ACM symposium on Parallel Algorithms and Architectures, Aug. 10-13, 2002, pp. 1-10.

Gao, et al., "Lock-Free Dynamic Hash Tables with Open Addressing", Retrieved Jan. 18, 2011 at <<http://arxiv.org/PS_cache/cs/pdf/0303/0303011v4.pdf>>, Distributed Computing—Special issue: PODC 02, vol. 18, Issue 01, Jul. 2005, pp. 1-49.

Gao, et al., "Almost Wait-Free Resizable Hashtables", Retrieved Jan. 18, 2011 at <<http://ieeexplore.ieee.org/stamp/stamp.jsp?arnumber>>, In Proceedings of the 18th International Parallel and Distributed Processing Symposium, Apr. 26-30, 2004, pp. 9.

Sundell, et al., "Scalable and Lock-Free Concurrent Dictionaries", Retrieved Jan. 18, 2011 at <<http://www.cse.chalmers.se/research/group/dcs/ConcurrentDataStructures/phd_chap6.pdf>>, Proceedings of the 2004 ACM symposium on Applied computing, 2004, pp. 1-38.

Shalev, et al., "Split-Ordered Lists: Lock-Free Extensible Hash Tables", Journal of the ACM (JACM), vol. 53, Issue 03, May 2006, pp. 379-405.

(Continued)

*Primary Examiner* — Rehana Perveen
*Assistant Examiner* — Alexander Khong
(74) *Attorney, Agent, or Firm* — Steve Wight; Carole Boelitz; Micky Minhas

(57) ABSTRACT

A table update component may perform updates on a dynamic linear hash table, the updates requested by clients based on request item values. A table capacity status component may determine first capacity indicators associated with the dynamic linear hash table, based on results of the update requests. A table maintenance component may initiate lock-free merges and lock-free splits of hash table buckets associated with the dynamic linear hash table, based on initiating lock-free merges and lock-free splits of linked lists included in hash table buckets associated with the dynamic linear hash table, based on the determined first capacity indicators, the linked lists including hashed items stored in the dynamic linear hash table.

20 Claims, 19 Drawing Sheets

(56) References Cited

OTHER PUBLICATIONS

Fagin, et al., "Extendible hashing—A Fast Access Method for Dynamic Files", ACM Transactions on Database Systems, vol. 4, No. 3 (1979), pp. 315-344.

Griswold, et al., "The Design and Implementation of Dynamic Hashing for Sets and Tables in Icon", Software—Practice and Experience, vol. 23, No. 4, 1993, pp. 351-367.

Larson, Per-Åke, "Dynamic Hashing," BIT, vol. 18, No. 2 (1978), pp. 184-201.

Larson, Per-Åke, "Dynamic Hash Tables," Communications of the ACM, vol. 31, No. 4, 1988, pp. 446-457.

Litwin, W., "Linear Hashing: A New Tool for File and Table Addressing," Proceedings of the 6th Conference on Very Large Databases (VLDB '81), 1981, pp. 212-223.

Michael, M.M., "Hazard Pointers: Safe Memory Reclamation for Lock-Free Objects," IEEE Transactions on Parallel and Distributed Systems vol. 5, No. 6 (2004), pp. 491-504.

\* cited by examiner

300

| 302 | Receive a request for a lock-free merge of a first hash table bucket and a second hash table bucket associated with a dynamic linear hash table, the first and second hash table buckets including respective first and second location indicators associated with respective first and second linked lists ordered based on a reverse-split ordering of hash key values associated with respective nodes of the respective first and second linked lists |

| 304 | Initiate the lock-free merge of the first hash table bucket and the second hash table bucket, via one or more device processors, based on initiating one or more atomic operations to set status indicators associated with the first and second hash table buckets |

| 306 | Receive a request for a lock-free split of a third hash table bucket associated with the dynamic linear hash table, the third hash table bucket including a third location indicator associated with a third linked list ordered based on a reverse-split ordering of hash key values associated with respective nodes of the third linked list |

| 308 | Initiate the lock-free split of the third hash table bucket based on initiating one or more atomic operations to set status indicators associated with the third hash table bucket, initiating a traversal of the third linked list to a split point node that includes an item having a reverse-bit hash key value that includes a bit configuration that includes a bucket splitting bit position bit value set to a predetermined splitting indicator, based on reverse-bit ordering of hash key values in the third linked list, and initiating an update to a hash table directory segment to indicate a location of the split point node as a location of a fourth linked list associated with a new hash table bucket |

| 310 | Receive a request for lock-free splits of a first plurality of hash table buckets associated with the dynamic linear hash table other than the third hash table bucket, the plurality of hash table buckets including respective location indicators associated with a respective first plurality of linked lists ordered based on a reverse-split ordering of hash key values associated with respective nodes of the first plurality of hash table buckets |

| 312 | Initiate the lock-free splits of the first plurality of hash table buckets in parallel with the lock-free split of the third hash table bucket |

FIG. 3

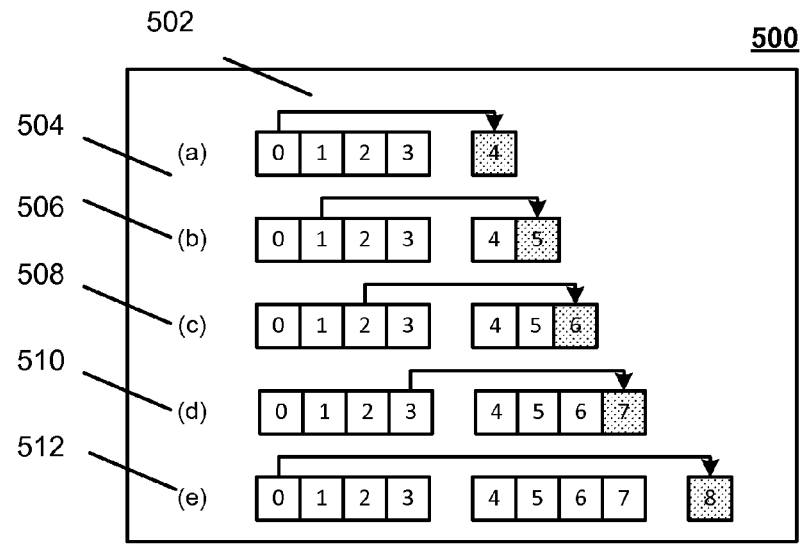
FIG. 5
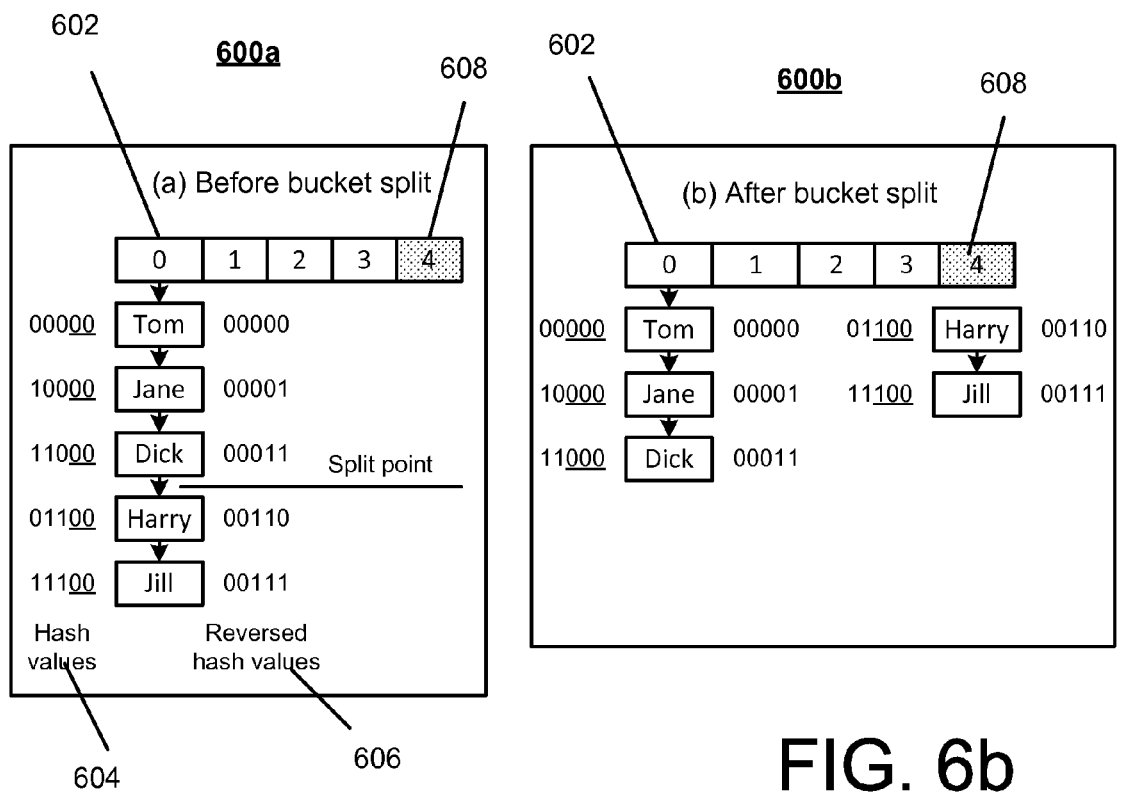
FIG. 6a
FIG. 6b

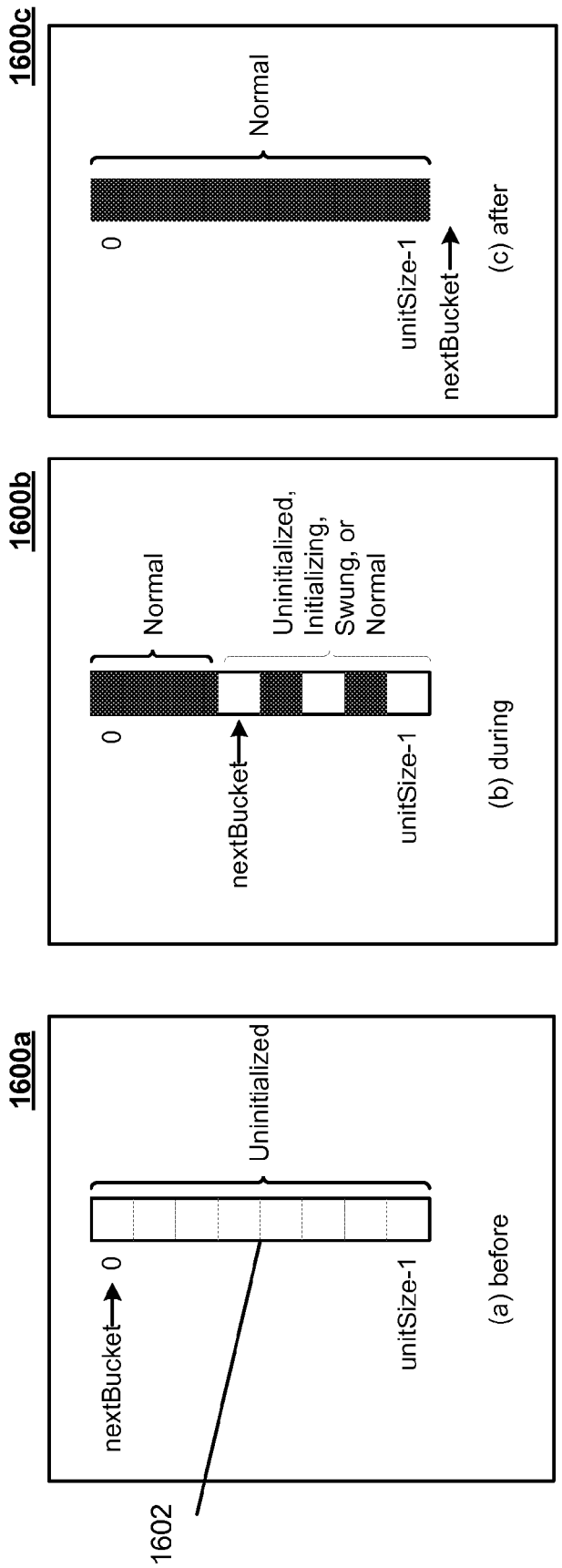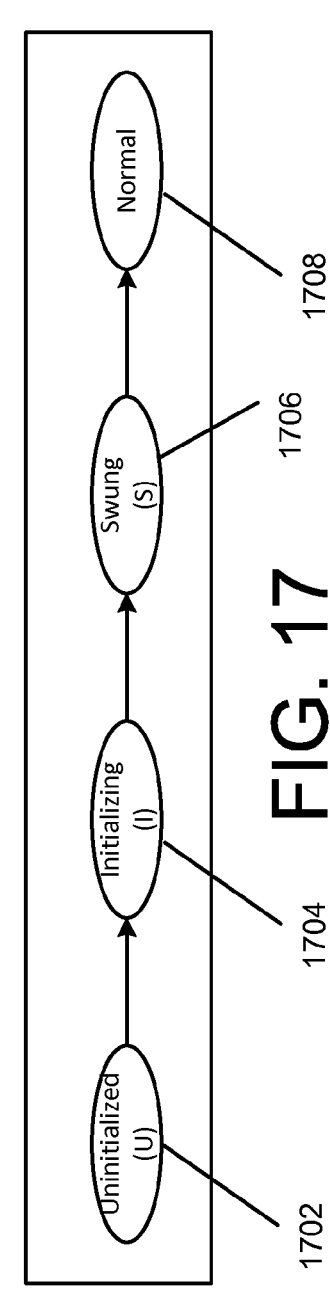

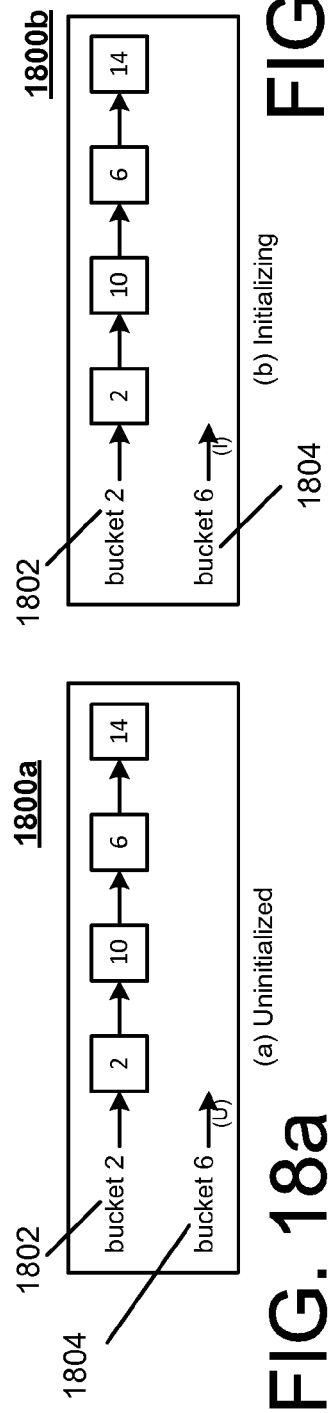
FIG. 18a (a) Uninitialized
FIG. 18b (b) Initializing
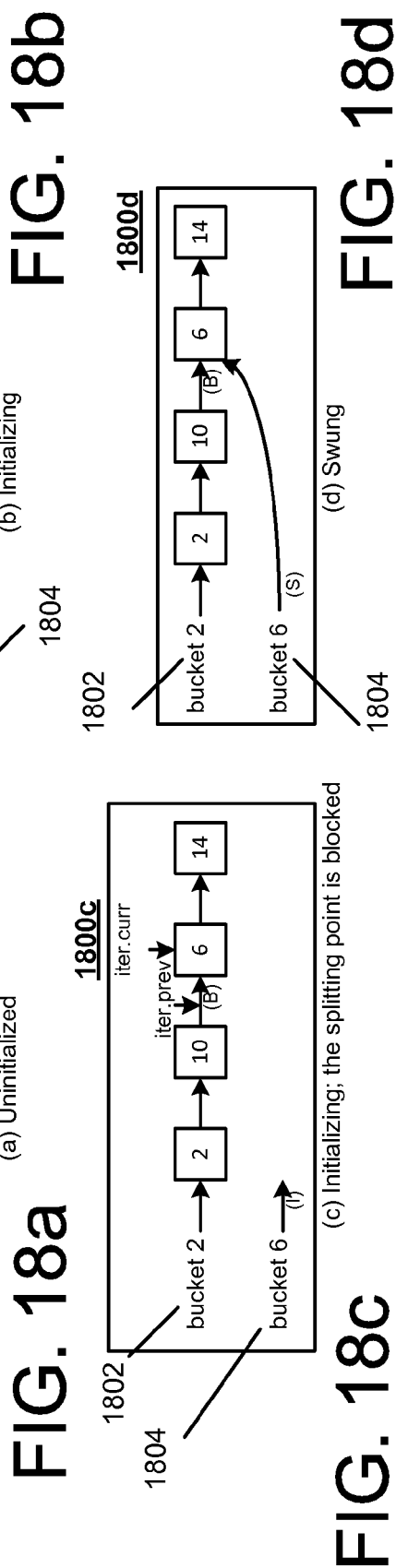
FIG. 18c (c) Initializing; the splitting point is blocked
FIG. 18d (d) Swung
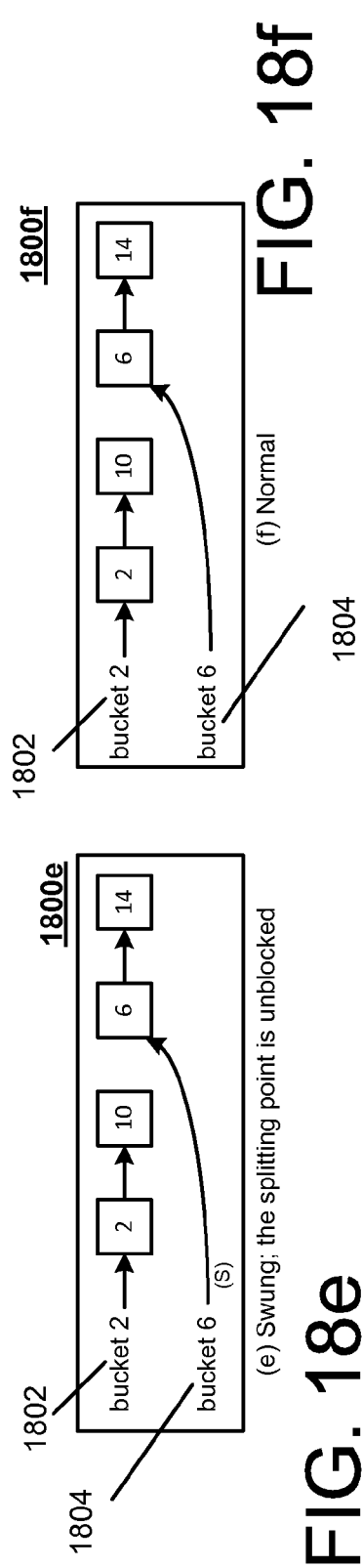
FIG. 18e (e) Swung; the splitting point is unblocked
FIG. 18f (f) Normal

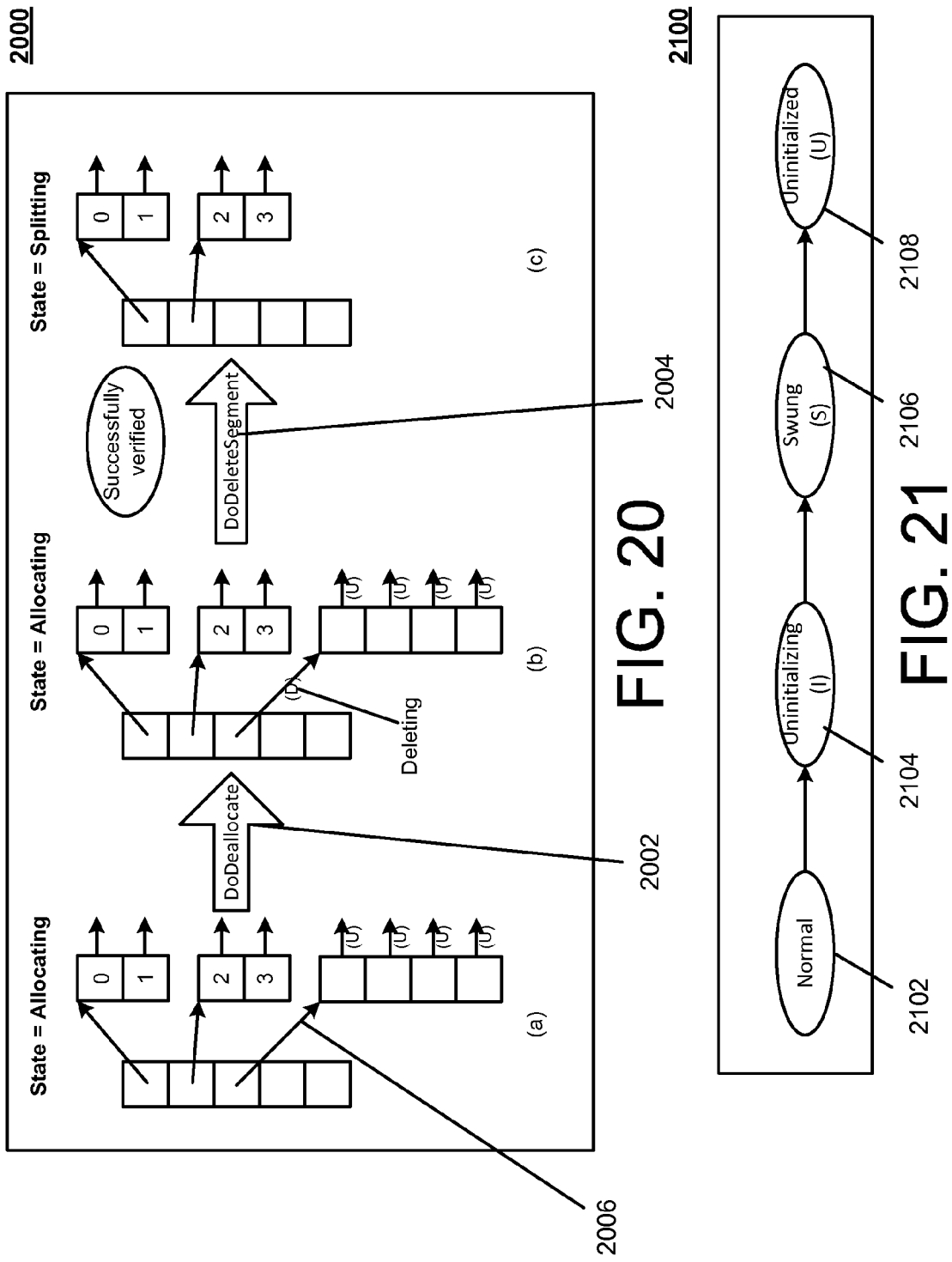

DYNAMIC LOCK-FREE HASH TABLES

BACKGROUND

Hash tables are data structures used in many high performance systems. Such systems may be highly concurrent and may run on multi-core central processing units (CPUs). Examples of such systems include web servers, database servers, and directory servers. For example, a hash table may be used for fast lookup in a (software) cache that includes frequently used items. The number of items in a cache may vary greatly, both over time and among installations.

Linear hashing is a technique for gradually increasing or decreasing the size of a hash table as the number of items changes so that the expected cost of operations (e.g., insert, lookup, delete) is O(1). Linear hashing may gradually expand a hash table by splitting buckets and may contract the table by merging buckets. The items included in a bucket may be stored on a single linked list. Buckets may be split (and merged) in a fixed order. During a split, approximately half of the items in the bucket may be relocated to a new bucket at the end of the hash table. For example, a bucket split may involve scanning the items in the bucket and re-computing their hash addresses to determine which items stay in the current bucket and which items will be relocated to the new bucket.

SUMMARY

According to one general aspect, a hash table manager may include a table update component configured to perform updates on a dynamic linear hash table, the updates requested by clients based on request item values. The hash table manager may also include a table capacity status component configured to determine first capacity indicators associated with the dynamic linear hash table, based on results of the update requests. The hash table manager may also include a table maintenance component configured to initiate lock-free merges and lock-free splits of hash table buckets associated with the dynamic linear hash table, based on initiating lock-free merges and lock-free splits of linked lists included in hash table buckets associated with the dynamic linear hash table, based on the determined first capacity indicators, the linked lists including hashed items stored in the dynamic linear hash table.

According to another aspect, a request may be received for a lock-free merge of a first hash table bucket and a second hash table bucket associated with a dynamic linear hash table, the first and second hash table buckets including respective first and second location indicators associated with respective first and second linked lists ordered based on a reverse-split ordering of hash key values associated with respective nodes of the respective first and second linked lists. The lock-free merge of the first hash table bucket and the second hash table bucket may be initiated based on initiating one or more atomic operations to set status indicators associated with the first and second hash table buckets.

According to another aspect, a computer program product tangibly embodied on a computer-readable storage medium may include executable code that may cause at least one data processing apparatus to receive a request to modify a current capacity of a dynamic lock-free linear hash table, the dynamic lock-free linear hash table including a plurality hashed items stored in linked lists included in hash table buckets associated with the dynamic lock-free linear hash table, the hash table buckets ordered based on a reverse-split ordering of hash key values associated with respective nodes of the linked lists included in the hash table buckets. Further, the at least one data processing apparatus may initiate a modification event, the modification event including initiating a modification of the current capacity based on initiating a plurality of atomic operations in parallel, to set status indicators associated with respective hash table buckets included in the plurality of hash table buckets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIG. 3 is a flowchart illustrating example operations of the system of FIG. 1.

FIG. 5 illustrates an example gradual expansion of an example linear hash table.

FIGS. 6a-6b illustrate an example split of a hash table bucket of an example linear hash table.

FIGS. 16a-16c illustrate a scenario of splitting parent buckets, according to an example embodiment.

FIG. 17 illustrates example state transitions of a bucket in initialization, according to an example embodiment.

FIGS. 18a-18f illustrate example steps of splitting a bucket, according to an example embodiment.

FIG. 20 illustrates an example deallocation of a segment, according to an example embodiment.

FIG. 21 illustrates example state transitions of a bucket being uninitialized, according to an example embodiment

DETAILED DESCRIPTION

Figure 1:
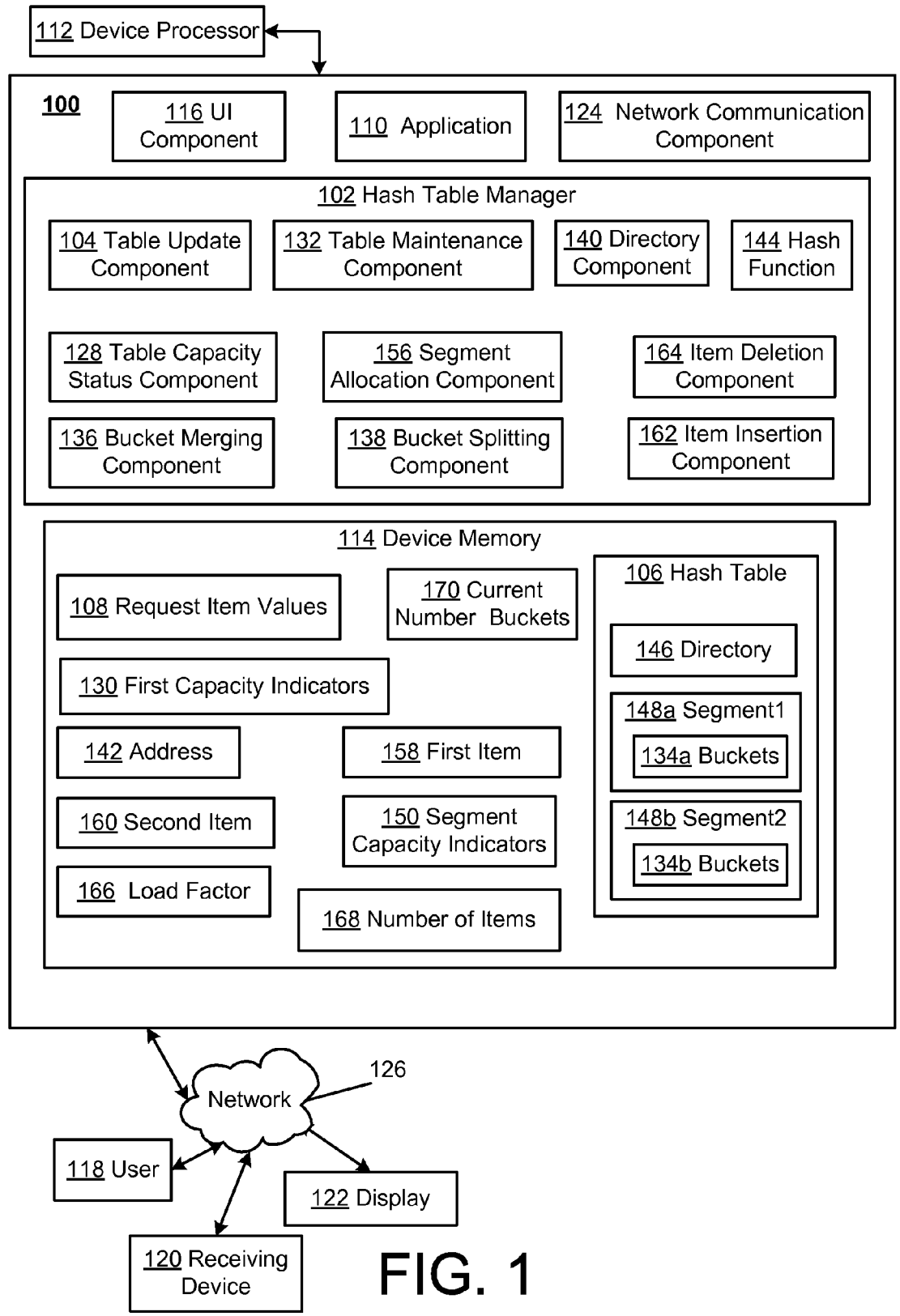
FIG. 1 is a block diagram of an example system for managing dynamic, lock-free hash tables.

Hash tables may be used in many high performance systems which may be highly concurrent and run on multi-core CPUs. Examples of such systems include web servers, database servers, and directory servers. If a hash table is used for fast lookup in a (software) cache that includes frequently used items, the number of items in the cache may vary greatly, both over time and among installations. Example techniques discussed herein may provide an example Linear Hashing, Lock Free (LHlf) hash table that may serve as a shared data structure (e.g., in a software cache) that may grow and shrink gradually in concert with the number of items stored, and may handle a high rate of concurrent operations, without wasting memory.

According to an example embodiment, an example hash table discussed herein may provide high levels of concurrency on current architectures. According to an example embodiment, an example hash table may be lock free and may expand and contract automatically in accordance with the number of items stored in the table. According to an example embodiment, hash table operations such as insertions, lookups and deletions are not blocked, even as the hash table is expanding and/or contracting.

Generally, hash tables may be created by using a hashing function (e.g., an algorithm) to hash item (e.g., key) values into hash buckets. Generally, each bucket may include a list of item-value pairs. Since different items may hash to the same bucket, hash table design may be directed to spreading out the item-value pairs evenly with each bucket storing as few item-value pairs as possible. When an item is searched in the hash table, it may be hashed to find the appropriate bucket. The bucket may then be searched for the desired item-value pair. According to an example embodiment, the bucket lists may be implemented as linked lists that store item values and a location indicator that indicates a location of a "next" node in the linked list. According to an example embodiment, the linked lists may be stored in the buckets without the hashed value of the item (e.g., the hashed key value).

One skilled in the art of data processing may understand that buckets may be implemented via many structure other than linked lists, without departing from the spirit of the discussion herein. Further, one skilled in the art of data processing will understand that "linked lists" may refer to many different implementations of storing information associated with retrieval of items associated with hash tables, without departing from the spirit of the discussion herein. For example, linked lists may be implemented as singly or multiply linked lists, or as various types of arrays.

According to an example embodiment, an example technique discussed herein may, at least, employ linear hashing techniques, as well as recursive split-ordering of the items stored in a hash table bucket. Thus, linked lists stored in the buckets may be both split and merged in a lock free manner.

In this context, "linear hashing" may refer to a technique for gradually increasing or decreasing the size of a hash table as the number of items changes so that the expected cost of operations (insert, lookup, delete) remains O(1), as discussed further below.

For example, a linear hashing technique may gradually expand a hash table by splitting buckets and may contract the table by merging buckets. According to an example embodiment, the items in a bucket may be stored on a linked list. According to an example embodiment, buckets may be split (and merged) in a fixed order.

According to an example embodiment, approximately half of the items in a bucket may be relocated to a new bucket at the end of the hash table during a split operation. A bucket split may conventionally be performed by scanning the items in the bucket and re-computing their hash addresses to determine which ones stay in the current bucket, and which ones will be relocated to the new bucket.

According to an example embodiment, an example technique discussed herein may order the items in each bucket in reverse split order. For example, the reverse split ordering may provide techniques for splitting buckets atomically, based on identifying linked list split points and dividing the linked lists into two pieces of approximately equal size.

In this context, an "atomic" operation may refer to an operation that may be performed in an uninterruptable manner. For example, an atomic operation may be used to secure a resource in a computing environment, such that other concurrently running processes may not be able to use the resource until the resource is freed. For example, a state of a resource may set by using an atomic operation (i.e., such that other concurrently running processes may not access the resource as the state is being set by the atomic operation).

According to an example embodiment, example techniques discussed herein may be directed to a linear hash table that includes a directory with array segments having exponentially increasing size. According to an example embodiment, example techniques discussed herein may be directed to linear hash tables that include buckets arranged such that the items (e.g., records) are stored in respective buckets sorted in reverse split order, as discussed further below. According to an example embodiment, an example techniques discussed herein may be directed to linear hash tables that may be expanded and contracted in larger steps than just a single bucket at a time, thus providing greater concurrency during expansion and contraction. According to an example embodiment, a fixed expansion (contraction) size may be employed to provide reductions in execution time.

As further discussed herein, FIG. 1 is a block diagram of a system 100 for managing dynamic, lock-free hash tables. As shown in FIG. 1, the system 100 may include a hash table manager 102 that includes a table update component 104 configured to perform updates on a dynamic linear hash table 106, the updates requested by clients based on request item values 108.

According to an example embodiment, an application 110 may access the dynamic linear hash table 106. According to an example embodiment, one or more of the updates may be requested via the application 110.

According to an example embodiment, executable instructions associated with the hash table manager 102 may be stored on computer-readable media, and may be executed, for example, via a device processor 112, as discussed further below. According to an example embodiment, the computer-readable storage media may include any number of storage devices, and any number of storage media types, including distributed devices.

In this context, a "processor" may include a single processor or multiple processors configured to process instructions associated with a processing system. A processor may thus include multiple processors processing instructions in parallel and/or in a distributed manner. For example, the system 100 may include a multithreaded and/or shared-memory multiprocessor (SMP) system.

In this context, a "thread" may refer to an individual unit of processing that may be scheduled by an operating system. In this context, a "lock-free" data structure may refer to a data structure that may be accessed concurrently by processing units (e.g., threads) such that suspended processing units (e.g., threads) do not block other processing units from completing their operations. For example, if a thread "goes to sleep" (e.g., is suspended for some reason), other threads are not blocked from making progress in their operations. For example, a lock-free object may include an accessibility status that includes simultaneous, or concurrent access to the lock-free object for a plurality of processing units (e.g., threads), wherein non-suspended ones of the processing units may continue processing of a set of execution tasks during temporal intervals when one or more suspended ones of the processing units may suspend processing of operations associated with the suspended ones of the processing units.

Although the device processor 112 is depicted as external to the hash table manager 102 in FIG. 1, one skilled in the art of data processing will appreciate that the device processor 112 may be implemented as a single component, and/or as distributed units which may be located internally or externally to the hash table manager 102, and/or any of its elements.

According to an example embodiment, the hash table manager 102 may include a device memory 114 that may store the request item values 108. In this context, a "memory" may include a single memory device or multiple memory devices configured to store data and/or instructions. Further, the device memory 114 may span multiple distributed storage devices.

According to an example embodiment, a user interface component 116 may manage communications between a user 118 and the hash table manager 102. The user 118 may be associated with a receiving device 120 that may be associated with a display 122 and other input/output devices. For example, the display 122 may be configured to communicate with the receiving device 120, via internal device bus communications, or via at least one network connection.

For example, the user 118 may provide input indicating a user request via an input device associated with the hash table manager 102 (e.g., a keyboard, touchpad, touchscreen, mouse click, audio input device for receiving voice input), the request input received by the user interface component 116.

According to an example embodiment, the hash table manager 102 may include a network communication component 124 that may manage network communication between the hash table manager 102 and other entities that may communicate with the hash table manager 102 via at least one network 126. For example, the at least one network 126 may include at least one of the Internet, at least one wireless network, or at least one wired network. For example, the at least one network 126 may include a cellular network, a radio network, or any type of network that may support transmission of data for the hash table manager 102. For example, the network communication component 124 may manage network communications between the hash table manager 102 and the receiving device 120. For example, the network communication component 124 may manage network communication between the user interface component 116 and the receiving device 120.

A table capacity status component 128 may be configured to determine first capacity indicators 130 associated with the dynamic linear hash table 106, based on results of the update requests. For example, a load factor value may be determined based on a load associated with the dynamic linear hash table 106, as discussed further below.

A table maintenance component 132 may be configured to initiate lock-free merges and lock-free splits of hash table buckets 134 associated with the dynamic linear hash table 106, based on initiating lock-free merges and lock-free splits of linked lists included in hash table buckets 134 associated with the dynamic linear hash table 134, based on the determined first capacity indicators 130, the linked lists including hashed items stored in the dynamic linear hash table 106.

According to an example embodiment, the lock-free merges and lock-free splits of the hash table buckets 134 are based on an accessibility status that includes simultaneous access to each one of the hash table buckets 134 for a plurality of processing units, wherein non-suspended ones of the processing units continue processing of a first set of execution tasks during temporal intervals when one or more suspended ones of the processing units suspend processing operations associated with the suspended ones of the processing units.

According to an example embodiment, the linked lists included in the hash table buckets 134 associated with the dynamic linear hash table 106 may be ordered based on a reverse-split ordering of hash key values associated with respective nodes of the linked lists included in the hash table buckets 134. For example, the reverse-split ordering may be based on a reverse-bit ordering of hash key values associated with nodes of the linked lists, as discussed further below.

In this context, a "linear hash table" may refer to a linearly expanding and linearly contracting dynamic hash table.

According to an example embodiment, a bucket merging component 136 may be configured to initiate lock-free merges of a first portion of the hash table buckets 134, based on state-setting atomic operations that set states of objects associated with the dynamic linear hash table 106, and other merging operations that respect the set states of the objects associated with the dynamic linear hash table 106.

According to an example embodiment, the state-setting atomic operations that set the states of the objects associated with the dynamic linear hash table 106 may include at least one compare and swap (CAS) operation or at least one test and set (TS) operation, as discussed further below.

According to an example embodiment, the bucket merging component 136 may be configured to initiate the lock-free merges of the first portion of the hash table buckets 134 based on initiating one or more atomic operations that set status indicators associated with respective hash table buckets included in the first portion of the hash table buckets 134. Example status indicators are discussed further below.

According to an example embodiment, a bucket splitting component 138 may be configured to initiate lock-free splits of a second portion of the hash table buckets 134, based on state-setting atomic operations that set states of objects associated with the dynamic linear hash table 106, and other splitting operations that respect the set states of the objects associated with the dynamic linear hash table 106.

According to an example embodiment, the bucket splitting component 138 may be configured to initiate the lock-free splits of the second portion of the hash table buckets 134 one or more atomic operations to set status indicators associated with respective hash table buckets included in the second portion of the hash table buckets 134.

According to an example embodiment, a directory component 140 may be configured to determine a location of one of the hash table buckets 134, based on one of the update requests and a first hash function 144, based on accessing a hash table directory 146 associated with the dynamic linear hash table 106, the hash table directory 146 including location indicators associated with segments 148, the segments 148 including location indicators associated with respective ones of the hash table buckets 134 that are associated with the dynamic linear hash table 106.

According to an example embodiment, the hash table manager 102 may be configured to perform additions and deletions of segments 148 associated with the hash table directory 146, based on status indicators associated with the respective segments 148.

According to an example embodiment, a segment allocation component 156 may be configured to request storage for added segments based on an exponential size increase for each newly requested segment after a first and second segment addition.

According to an example embodiment, the update requests may include one or more of an update request for adding a first item 158 to the dynamic linear hash table 106, or an update request for removing a second item 160 from the dynamic linear hash table 106.

According to an example embodiment, the update request for adding the first item 158 to the dynamic linear hash table 106 may be based on a query request to locate the first item 158 in the dynamic linear hash table 106. For example, processing of the query request to locate the first item 158 in the dynamic linear hash table 106 may determine that the first item 158 currently does not exist in the dynamic linear hash table 106, triggering an add operation to add the first item 158 to the dynamic linear hash table 106.

According to an example embodiment, an item insertion component 162 may be configured to add the first item 158 to the dynamic linear hash table 106 via lock-free insertion of an added hashed item to a first one of the linked lists, based on reverse-split ordering associated with nodes of the first one of the linked lists.

According to an example embodiment, an item deletion component 164 may be configured to remove the second item 160 from the dynamic linear hash table 106 via lock-free deletion of a deletion hashed item from a second one of the linked lists, based on reverse-split ordering associated with nodes of the second one of the linked lists.

According to an example embodiment, the table capacity status component 128 may be configured to determine one of the first capacity indicators 130 associated with the dynamic linear hash table 106, based on a load factor 166 associated with the dynamic linear hash table 106, the load factor 166 indicating a value representing a number of items 168 stored in the dynamic linear hash table 106 divided by a current number 170 of the hash table buckets 134.

Figure 2A:
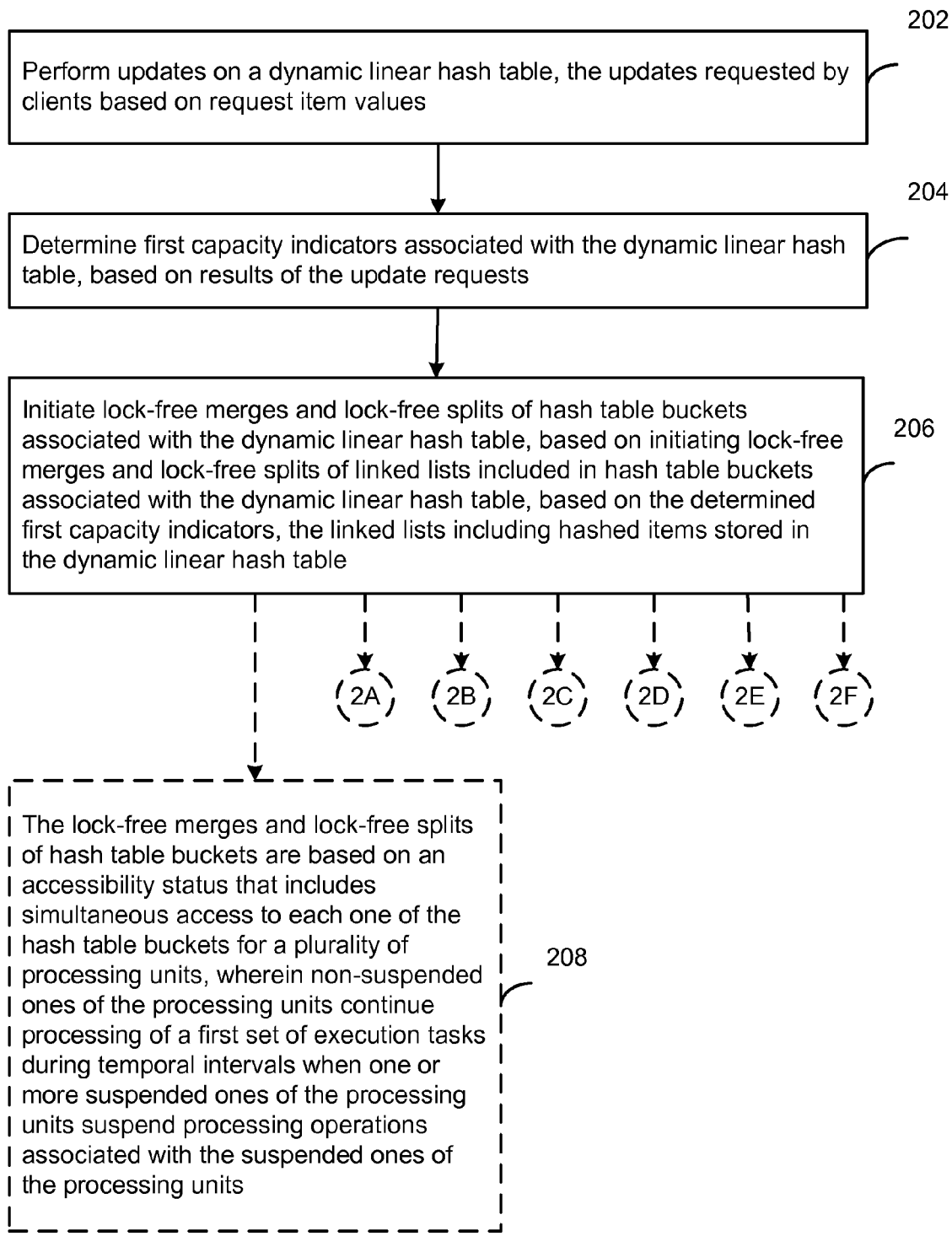
FIGS. 2a-2d are a flowchart illustrating example operations of the system of FIG. 1.
Figure 2B:
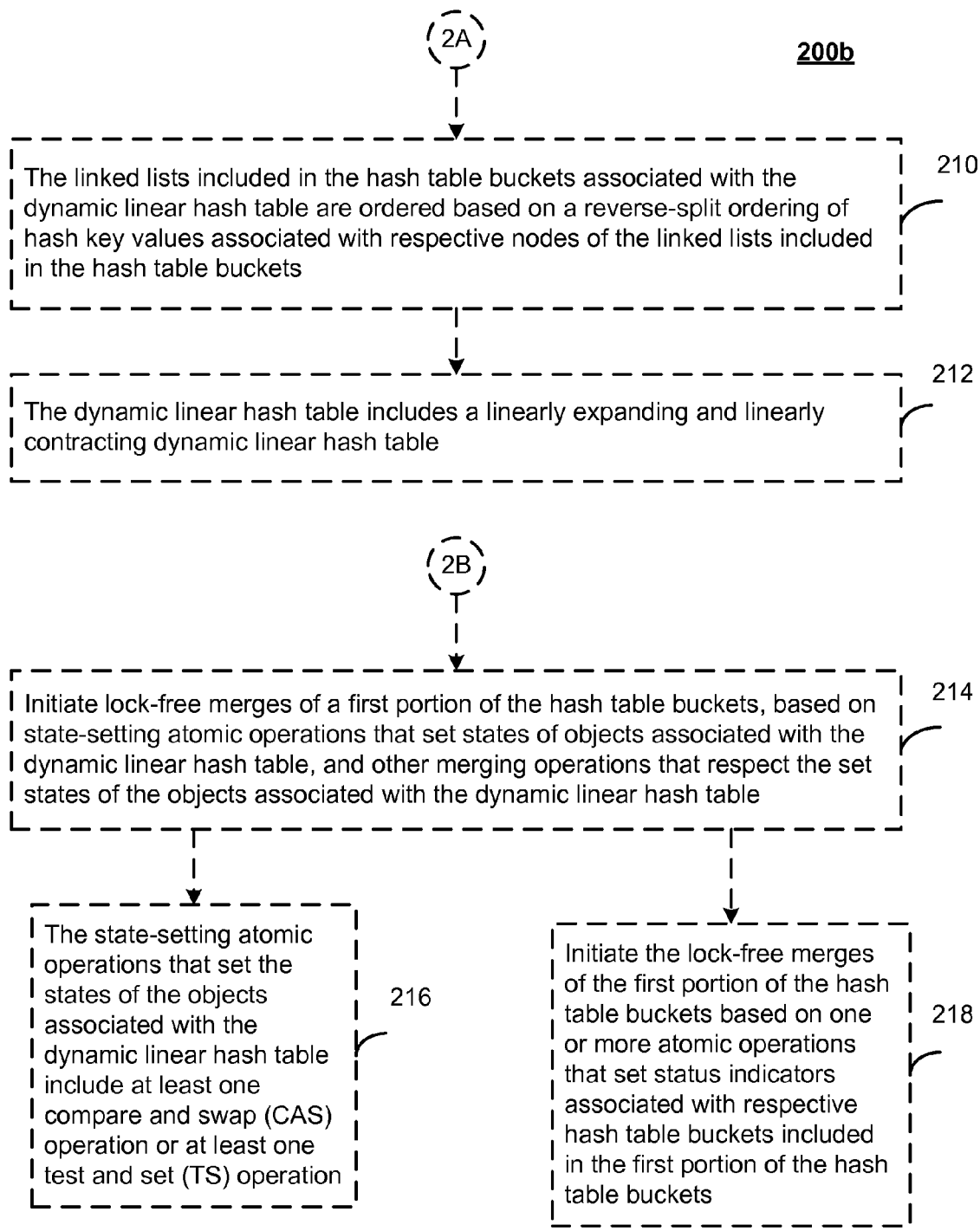
Figure 2C:
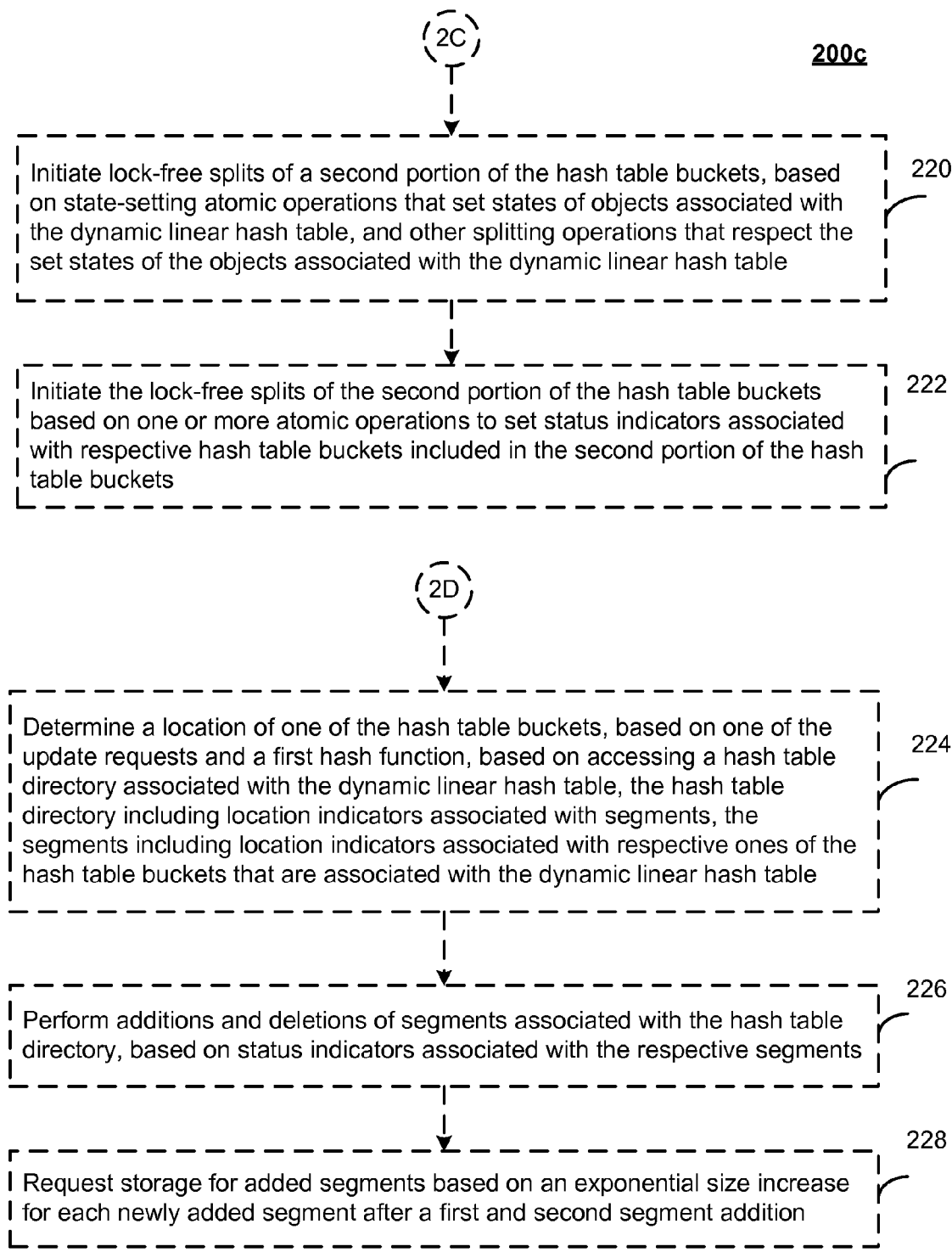
Figure 2D:
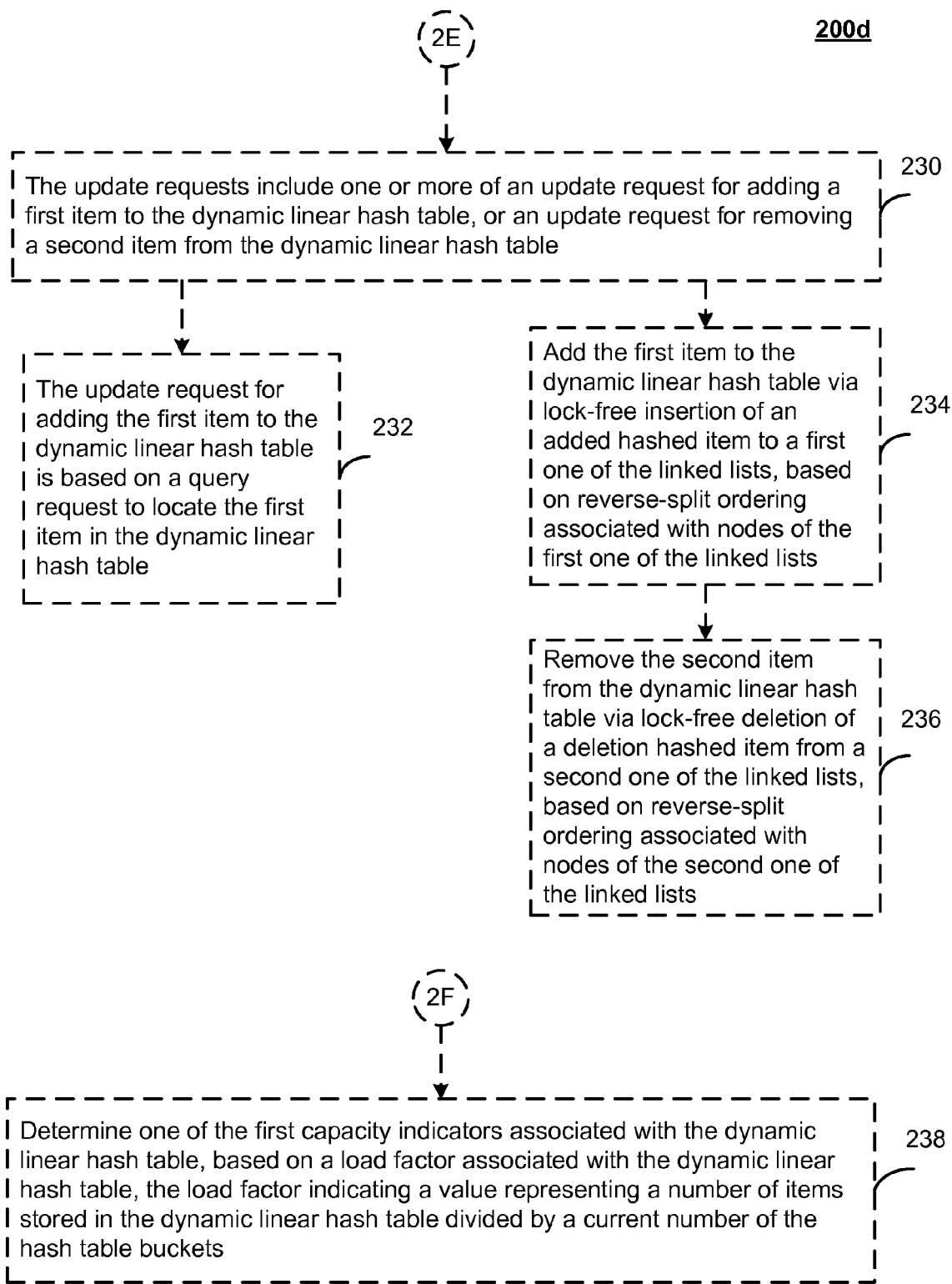

FIGS. 2*a*-2*d* are a flowchart illustrating example operations of the system of FIG. 1, according to example embodiments. In the example of FIG. 2*a*, updates may be performed on a dynamic linear hash table, the updates requested by clients based on request item values (202). For example, the table update component 104 may perform updates on the dynamic linear hash table 106, the updates requested by clients based on request item values 108, as discussed above.

First capacity indicators associated with the dynamic linear hash table may be determined, based on results of the update requests (204). For example, the table capacity status component 128 may determine first capacity indicators 130 associated with the dynamic linear hash table 106, based on results of the update requests, as discussed above.

Lock-free merges and lock-free splits of hash table buckets associated with the dynamic linear hash table may be initiated, based on initiating lock-free merges and lock-free splits of linked lists included in hash table buckets associated with the dynamic linear hash table, based on the determined first capacity indicators, the linked lists including hashed items stored in the dynamic linear hash table (206). For example, the table maintenance component 132 may initiate lock-free merges and lock-free splits of hash table buckets 134 associated with the dynamic linear hash table 106, based on initiating lock-free merges and lock-free splits of linked lists included in hash table buckets 134 associated with the dynamic linear hash table 134, based on the determined first capacity indicators 130, the linked lists including hashed items stored in the dynamic linear hash table 106, as discussed above.

According to an example embodiment, the lock-free merges and lock-free splits of hash table buckets may be based on an accessibility status that includes simultaneous access to each one of the hash table buckets for a plurality of processing units, wherein non-suspended ones of the processing units continue processing of a first set of execution tasks during temporal intervals when one or more suspended ones of the processing units suspend processing operations associated with the suspended ones of the processing units (208).

According to an example embodiment, the linked lists included in the hash table buckets associated with the dynamic linear hash table may be ordered based on a reverse-split ordering of hash key values associated with respective nodes of the linked lists included in the hash table buckets (210).

According to an example embodiment, the dynamic linear hash table includes a linearly expanding and linearly contracting dynamic linear hash table (212).

According to an example embodiment, lock-free merges of a first portion of the hash table buckets may be initiated, based on state-setting atomic operations that set states of objects associated with the dynamic linear hash table, and other merging operations that respect the set states of the objects associated with the dynamic linear hash table (214). For example, the bucket merging component 136 may initiate lock-free merges of a first portion of the hash table buckets 134, based on state-setting atomic operations that set states of objects associated with the dynamic linear hash table 106, and other merging operations that respect the set states of the objects associated with the dynamic linear hash table 106, as discussed above.

For example, the bucket merging component 136 may initiate the lock-free merges of the first portion of the hash table buckets 134 based on initiating one or more parallel atomic operations to set status indicators associated with respective hash table buckets included in the first portion of the hash table buckets 134.

According to an example embodiment, the state-setting atomic operations that set the states of the objects associated with the dynamic linear hash table may include at least one compare and swap (CAS) operation or at least one test and set (TS) operation (216).

According to an example embodiment, the lock-free merges of the first portion of the hash table buckets may be initiated based on one or more atomic operations that set status indicators associated with respective hash table buckets included in the first portion of the hash table buckets (218). For example, the bucket merging component 136 may initiate the lock-free merges of the first portion of the hash table buckets 134 based on initiating one or more atomic operations that set status indicators associated with respective hash table buckets included in the first portion of the hash table buckets 134, as discussed above.

According to an example embodiment, lock-free splits of a second portion of the hash table buckets may be initiated, based on state-setting atomic operations that set states of objects associated with the dynamic linear hash table, and other splitting operations that respect the set states of the objects associated with the dynamic linear hash table (220). For example, the bucket splitting component 138 may initiate lock-free splits of a second portion of the hash table buckets 134, based on state-setting atomic operations that set states of objects associated with the dynamic linear hash table 106, and other splitting operations that respect the set states of the objects associated with the dynamic linear hash table 106, as discussed above.

According to an example embodiment, the lock-free splits of the second portion of the hash table buckets may be initiated based on one or more atomic operations to set status indicators associated with respective hash table buckets included in the second portion of the hash table buckets (222). For example, the bucket splitting component 138 may initiate the lock-free splits of the second portion of the hash table buckets 134 one or more atomic operations to set status indicators associated with respective hash table buckets included in the second portion of the hash table buckets 134, as discussed above.

According to an example embodiment, a location of one of the hash table buckets may be determined, based on one of the update requests and a first hash function, based on accessing a hash table directory associated with the dynamic linear hash table, the hash table directory including location indicators associated with segments, the segments including location indicators associated with respective ones of the hash table buckets that are associated with the dynamic linear hash table (224). For example, the directory component 140 may determine a location of one of the hash table buckets 134, based on one of the update requests and a first hash function 144, based on accessing a hash table directory 146 associated with the dynamic linear hash table 106, the hash table directory 146 including location indicators associated with segments 148, the segments 148 including location indicators associated with respective ones of the hash table buckets 134 that are associated with the dynamic linear hash table 106, as discussed above.

According to an example embodiment, additions and deletions of segments associated with the hash table directory may be performed, based on status indicators associated with the respective segments (226). For example, the hash table manager 102 may perform additions and deletions of segments 148 associated with the hash table directory 146, based on status indicators associated with the respective segments 148, as discussed above.

According to an example embodiment, storage for added segments may be requested based on an exponential size increase for each newly added segment after a first and second segment addition (228). For example, the segment allocation component 156 may request storage for added segments based on an exponential size increase for each newly requested segment after a first and second segment addition, as discussed above.

According to an example embodiment, the update requests may include one or more of an update request for adding a first item to the dynamic linear hash table, or an update request for removing a second item from the dynamic linear hash table (230). For example, the update requests may include one or more of an update request for adding a first item 158 to the dynamic linear hash table 106, or an update request for removing a second item 160 from the dynamic linear hash table 106, as discussed above.

According to an example embodiment, the update request for adding the first item to the dynamic linear hash table may be based on a query request to locate the first item in the dynamic linear hash table (232).

According to an example embodiment, the first item may be added to the dynamic linear hash table via lock-free insertion of an added hashed item to a first one of the linked lists, based on reverse-split ordering associated with nodes of the first one of the linked lists (234). For example, the item insertion component 162 may add the first item 158 to the dynamic linear hash table 106 via lock-free insertion of an added hashed item to a first one of the linked lists, based on reverse-split ordering associated with nodes of the first one of the linked lists, as discussed above.

According to an example embodiment, the second item may be removed from the dynamic linear hash table via lock-free deletion of a deletion hashed item from a second one of the linked lists, based on reverse-split ordering associated with nodes of the second one of the linked lists (236). For example, the item deletion component 164 may remove the second item 160 from the dynamic linear hash table 106 via lock-free deletion of a deletion hashed item from a second one of the linked lists, based on reverse-split ordering associated with nodes of the second one of the linked lists, as discussed above.

According to an example embodiment, one of the first capacity indicators associated with the dynamic linear hash table may be determined, based on a load factor associated with the dynamic linear hash table, the load factor indicating a value representing a number of items stored in the dynamic linear hash table divided by a current number of the hash table buckets (238). For example, the table capacity status component 128 may determine one of the first capacity indicators 130 associated with the dynamic linear hash table 106, based on a load factor 166 associated with the dynamic linear hash table 106, the load factor 166 indicating a value representing a number of items 168 stored in the dynamic linear hash table 106 divided by a current number 170 of the hash table buckets 134, as discussed above.

FIG. 3 is a flowchart illustrating example operations of the system of FIG. 1, according to example embodiments. In the example of FIG. 3, a request for a lock-free merge of a first hash table bucket and a second hash table bucket associated with a dynamic linear hash table may be received, the first and second hash table buckets including respective first and second location indicators associated with respective first and second linked lists ordered based on a reverse-split ordering of hash key values associated with respective nodes of the respective first and second linked lists (302). For example, the bucket merging component 136 may receive the request from the table maintenance component 132, as discussed above.

The lock-free merge of the first hash table bucket and the second hash table bucket may be initiated based on initiating one or more atomic operations to set status indicators associated with the first and second hash table buckets (304). For example, the bucket merging component 136 may initiate lock-free merges of a first portion of the hash table buckets 134 based on initiating one or more atomic operations to set status indicators associated with respective hash table buckets 134 included in the first portion of the hash table buckets 134, as discussed above.

According to an example embodiment, a request for a lock-free split of a third hash table bucket associated with the dynamic linear hash table may be received, the third hash table bucket including a third location indicator associated with a third linked list ordered based on a reverse-split ordering of hash key values associated with respective nodes of the third linked list (306). For example, the bucket splitting component 138 may receive the request from the table maintenance component 132, as discussed above.

According to an example embodiment, initiating the lock-free split of the third hash table bucket may be based on initiating one or more atomic operations to set status indicators associated with the third hash table bucket, initiating a traversal of the third linked list to a split point node that includes an item having a reverse-bit hash key value that includes a bit configuration that includes a bucket splitting bit position bit value set to a predetermined splitting indicator, based on reverse-bit ordering of hash key values in the third linked list, and initiating an update to a hash table directory segment to indicate a location of the split point node as a location of a fourth linked list associated with a new hash table bucket (308). For example, the bucket splitting component 138 may initiate the lock-free splits, as discussed further herein.

According to an example embodiment, a request for lock-free splits of a first plurality of hash table buckets associated with the dynamic linear hash table other than the third hash table bucket may be received, the plurality of hash table buckets including respective location indicators associated with a respective first plurality of linked lists ordered based on a reverse-split ordering of hash key values associated with respective nodes of the first plurality of hash table buckets (310). For example, the bucket splitting component 138 may receive the request from the table maintenance component 132, as discussed further herein.

According to an example embodiment, the lock-free splits of the first plurality of hash table buckets may be initiated in parallel with the lock-free split of the third hash table bucket (312). For example, the bucket splitting component 138 may initiate lock-free splits of a second portion of the hash table buckets 134 based on initiating one or more atomic operations to set status indicators associated with respective hash table buckets included in the second portion of the hash table buckets 134, in parallel.

Figure 4:
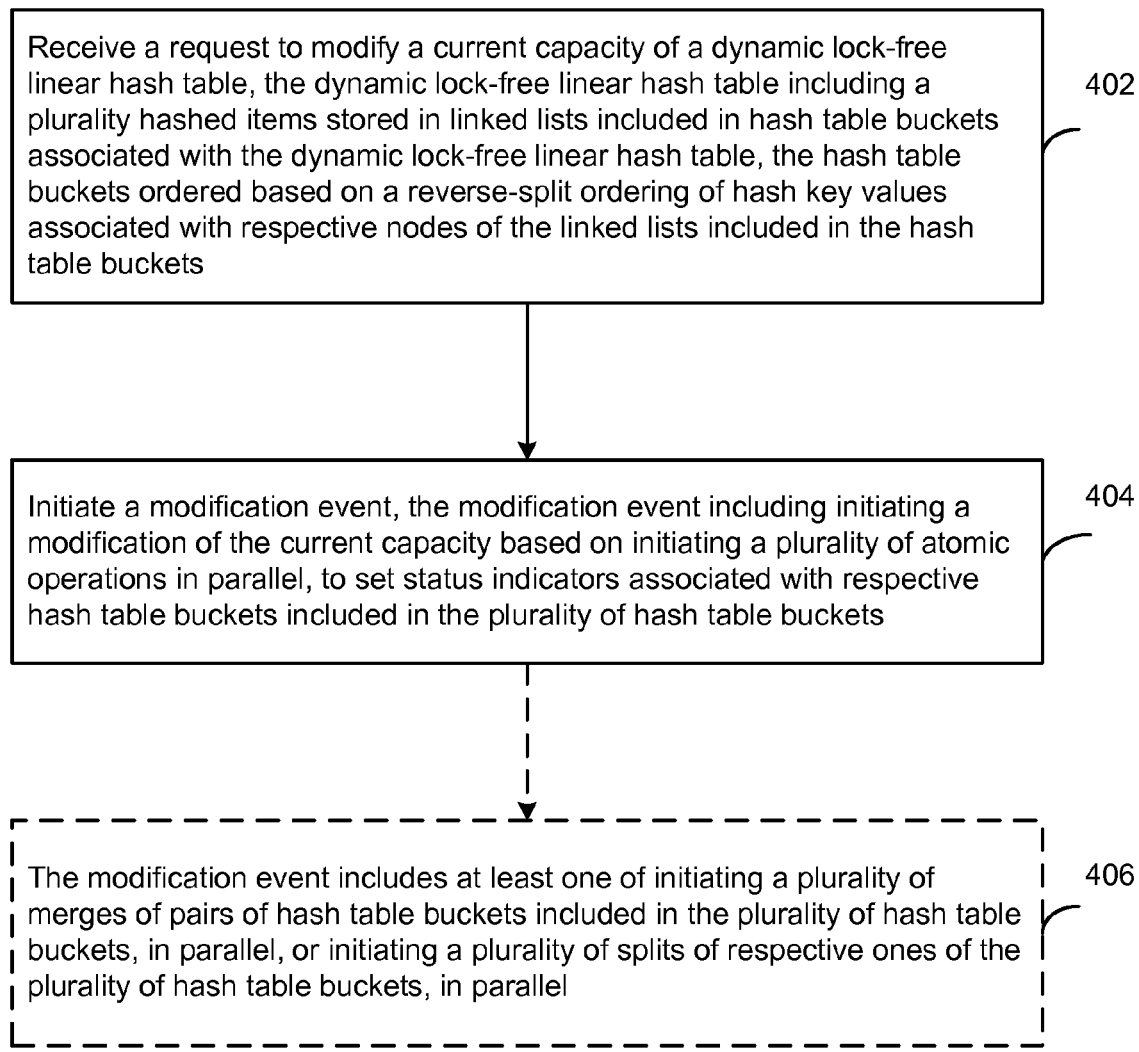
FIG. 4 is a flowchart illustrating example operations of the system of FIG. 1.

FIG. 4 is a flowchart illustrating example operations of the system of FIG. 1, according to example embodiments. In the example of FIG. 4, a request to modify a current capacity of a dynamic lock-free linear hash table may be received, the dynamic lock-free linear hash table including a plurality hashed items stored in linked lists included in hash table buckets associated with the dynamic lock-free linear hash table, the hash table buckets ordered based on a reverse-split ordering of hash key values associated with respective nodes of the linked lists included in the hash table buckets (402).

A modification event may be initiated, the modification event including initiating a modification of the current capacity based on initiating a plurality of atomic operations in parallel, to set status indicators associated with respective hash table buckets included in the plurality of hash table buckets (404).

According to an example embodiment, the modification event may include at least one of initiating a plurality of merges of pairs of hash table buckets included in the plurality of hash table buckets, in parallel, or initiating a plurality of splits of respective ones of the plurality of hash table buckets, in parallel (406). The operations are discussed further below.

An increasing load on a hash table may increase the cost of all operations on the hash table (e.g., insertion, lookup, and deletion). If a user desires for performance to remain acceptable when the number of items increases, the user may wish to increase the table size. For example, a new, larger hash table may be generated and all the records may then be hashed into the new table. As another example, linear hashing may provide a smooth growth: the table may expand gradually, one bucket at a time. For example, when a new bucket is added to the table, a limited local reorganization may be performed.

A hash table may include N buckets with addresses 0, 1, ..., N−1. In this context, a bucket may include a linked list that may store all the items that are hashed to the same address. According to an example embodiment, linear hashing may increase the address space gradually by splitting the buckets in a fixed order: bucket 0, bucket 1, ..., up to and including bucket N−1. According to an example embodiment, when a bucket is split, approximately half of its items may be moved to a new bucket at the end of the hash table.

FIG. 5 illustrates an example gradual expansion of an example linear hash table. As shown in FIG. 5, a splitting process is illustrated for an example hash table 502 that includes four buckets (N=4). A pointer p may keep track of the next bucket to be split. When all N buckets have been split and the table size has doubled to 2N, the pointer p may be reset to zero and the splitting process may start over again. In a second iteration, the pointer may be adjusted from 0 to 2N−1, doubling the table size to 4N. This expansion process may continue as long as desired.

Step 504 illustrates the splitting of bucket 0 for the example table 502 with four buckets. According to an example embodiment, an entry in the hash table 502 may include a single pointer, which is the head of a linked list connecting all records that hashed to that address. According to an example embodiment, g (K) may be a hash function that inputs a record key and determines a (32-bit or 64-bit integer) hash key. For example, when the table is of size 4, the address of every record may be indicated as $h_0=g(K)$ mod 4. For example, when the table size has doubled to 8, all records may be addressed by $h_1=g(K)$ mod 8. However, instead of doubling the table size immediately, linear hashing may expand the hash table one bucket at a time.

In order for a record to hash to bucket 0 under $h_0(K)=g(K)$ mod 4, the two low-order bits of the hash value g (K) will be indicated as zero, regardless of the value of higher-order bits. Under the hashing function $h_1(K)=g(K)$ mod 8, hash keys of the form ... 000 (three low-order bits equal to 0) still hash to bucket 0, while those of the form ... 100 (third bit equal to 1) hash to bucket 4. None of the keys hashing to buckets 1, 2, or 3 under $h_0$ may hash to bucket 4 under $h_1$. According to an example embodiment, to expand the hash table 502, a new bucket (with address 4) may be allocated at the end of the table, the pointer p may be increased by one, the items of bucket 0 may be scanned, and the items hashing to 4 under $h_1(K)=g(K)$ mod 8 may be relocated to the new bucket.

The hash address of an item may change as the table size changes; however, the current address of an item may be determined as discussed below. For example, for a key K, $h_0(K)$ may be determined. If $h_0(K)$ is less than p, the target bucket has already been split, otherwise not. If the bucket has been split, a correct address of the item may be determined by $h_1(K)$. When the original buckets (buckets 0-3) have been split (504, 506, 508, 510) and the table size has increased to 8, all records may be addressed by $h_1(K)$. Thus, a new hash function ($h_1$) is introduced for further expansion (i.e., for N=8 (512)).

According to an example embodiment, the address computation may be implemented in several ways. However, according to an example embodiment, the following example technique may be used.

According to an example embodiment, a sequence of hashing functions indicated as $h_i(K)=g(K) \mod(N*2^i)$, i=0, 1, ... may be used, where N is the minimum size of the hash table. If N is a power of two, a modulo operation may be reduced to extracting low-order bits of g (K).

According to an example embodiment, the current state of the hash table may be tracked based on two variables, which may be indicated as:

L=number of times the table size has doubled (from its minimum size N), and p=pointer to the next bucket to be split, $p<N*2^L$.

When the table is expanded by one bucket, these variables may be updated as:

```
p++;
if( p == N*(1 << L )) { L++ ; p = 0 ; }
```

According to an example embodiment, for a key K, the current address of the corresponding record associated with key K may be determined in accordance with:

```
addr = h_L(K);
if( addr < p ) addr = h_{L+1}(K);
```

According to an example embodiment, contracting the table by one bucket may be performed based on the inverse of operations for expanding it by one bucket. For example, the state variables may be updated in accordance with:

```
p--;
if( p < 0 ) { L-- ;
    p = N*(1 << L) - 1 ; }
```

According to an example embodiment, the records of the last bucket may be moved to the bucket pointed to by p, and the last bucket may be freed.

According to an example embodiment, decisions with regard to when to expand or contract a table may be based on several policies. For example, one policy may be based on bounding (e.g., an upper and/or lower bound) a load factor associated with the hash table.

For example, a load factor may be determined as the number of records in the hash table divided by the (current) number of buckets (e.g., the average chain length). For example, an upper and lower bound on the load factor may be predetermined the table may be expanded/contracted whenever the load factor goes above (below) the upper (lower) bound. According to an example embodiment, the current number of records in the table may be tracked, in addition to the state variables L and p discussed above.

According to an example embodiment, the hash table may be represented as an expanding and contracting array. According to an example embodiment, such a dynamic array may be implemented using a two-level data structure. The array may thus include smaller (array) segments. According to an example embodiment, when the array expands, new segments may be allocated as determined by example policies similar to those discussed above. According to an example embodiment, when the array contracts and a segment is no longer in use, it may be freed. According to an example embodiment, a segment directory may keep track of the start address of each segment in use.

One example version of linear hashing may use array segments of fixed size. However, as a table expands, the directory may also expand proportionally. According to an example embodiment, a fixed size directory may be generated, based on using segments of exponentially increasing size. According to an example embodiment, the first two segments may have the same size, to ensure that the total number of buckets is a power of two. For example, the first two segments may be of size 128 buckets, the next one of size 256 buckets, the next one of size 512 buckets, . . . , up to a predetermined maximum size after which additional segments are of fixed size.

This example technique may provide a small directory that may cover a large number of buckets. For example, if the smallest segment size is set to 1 KB and the maximum size to 1 GB, by using 64-bit pointers, the first two segments may store $128=2^7$ buckets, the third one $2^8$, . . . , and the 22nd and subsequent segments may store $2^{27}$ buckets. For example, a directory with 20 entries may cover a table with over 67M buckets, and a directory with 30 entries may cover a table with over 1.3B buckets.

According to an example embodiment, items in a bucket may be chained together via a linked list. For example if no specific ordering of the items on a list is imposed, then splitting a bucket may involve a complete scan of its linked list and redistribution of approximately half of the nodes of the bucket.

According to an example embodiment, an example technique as discussed herein may involve storing the linked lists in the buckets, sorted in recursive split-order. By using this ordering, a bucket may be split by dividing the linked list into two pieces and connecting the tail piece to the new bucket.

According to an example embodiment, recursive split-ordering may be implemented based on an example technique as discussed below. For example, a hash function g(K) as discussed below may generate 5-bit values and may use a hash table with only 4 buckets. FIGS. 6a-6b illustrate an example technique of splitting a bucket 0 (602). As shown in FIG. 6b, the contents of other buckets have no effect on the split.

Before the split, bucket 0 (602) may include five items with keys Tom, Jane, Dick, Harry and Jill. The 5-bit hash values 604 generated by g (K) are shown to the left of the items and the corresponding bit-reversed values 606 are shown to the right. For the example of FIGS. 6a-6b, the table size is 4 so the last two bits of the hash value (shown underlined) determine the hash address. All items in bucket 0 (602) have a hash value with the last two bits equal to zero. For example, the key Dick is associated with a hash value of 11000 which yields a bit-reversed value 00011.

According to an example embodiment, a determination of which items will remain in bucket 0 (602) and which will move to the new bucket 4 (608) depends on the third bit of the hash value. If the bit is 0, the new address will still be 0 (000) and the item remains. If the bit is 1, the new address will be 4 (100) and the item moves to the new bucket. According to an example embodiment, to simplify bucket splitting, the items on the chain may thus be clustered together according to the value of the third bit. For example, when the items are clustered in this way, splitting may be accomplished in accordance with scanning down the chain computing the new address of each item, and the first item F found whose address has changed may identify the split point. F and all subsequent items on the list may be moved to the new bucket. According to an example embodiment, splitting the bucket may then be reduced to updating two pointers. FIG. 6b illustrates the status of the example hash table after splitting bucket 0 (602).

If the table grows large, bucket 0 (602) may split many times, for example, when the hash table expands to 9 buckets, to 17 buckets, to 33 buckets, etc. At each stage, bucket 0 may be split again. According to an example embodiment, a chain may be split repeatedly if the items are stored sorted in ascending order on the bit-reversed hash values, which may be referred to as "recursive split order". For example, the chains in FIGS. 6a-6b are sorted in recursive split-order. For example, as shown in FIG. 6b, when bucket 0 (602) splits again, the split point may be located between Jane and Dick. If bucket 0 (602) splits once more, the split point may be located between Tom and Jane.

According to an example embodiment, linear hashing may expand a table by one bucket at a time and the expansion may be implemented via a thread performing an insert operation. Similarly, table contraction may occur one bucket at a time and may be implemented via a thread performing a delete operation. However, this example technique may involve table expansion that is serialized, such that splitting of the next bucket may not begin until the split of the previous bucket has completed. According to an example embodiment, to increase parallelism, example techniques discussed herein may include implementing expansions and contractions in larger steps (e.g., multiple buckets at a time), via multiple threads performing splits (or merges) of different buckets concurrently (in parallel).

According to an example embodiment, a thread may determine that a hash table is ready for expansion (e.g., based on a load factor value associated with the hash table). For example, the thread may mark the next 128 buckets as uninitialized (allocating additional space if desired), increment the table size by 128, and set the table state to Splitting. According to an example embodiment, any number other than 128 may also be selected as incremental size. According to an example embodiment, any thread that encounters an uninitialized bucket is responsible to perform a bucket split before accessing the target bucket. Similarly, any thread that determines that the table is splitting may contribute by splitting a bucket. Thus, the work of splitting a group of buckets may proceed in parallel.

Figure 7:
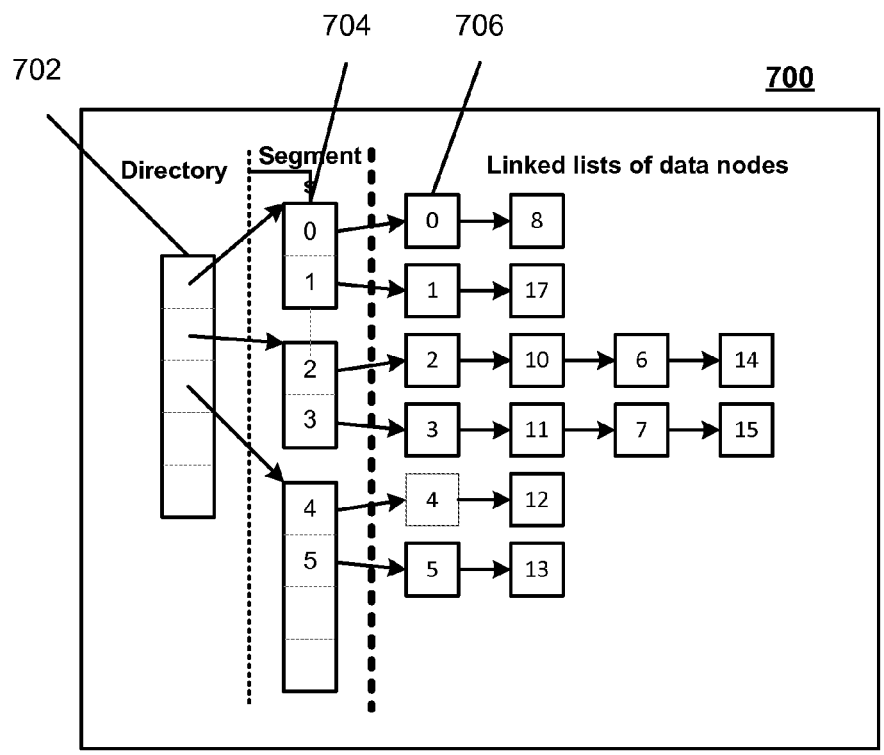
FIG. 7 illustrates an example linear hash table structure, according to an example embodiment.

FIG. 7 illustrates an example linear hash table structure in accordance with example hash table techniques discussed herein. According to an example embodiment, a Linear Hashing, Lock Free (LHlf) hash table may include a directory 702, segments 704, and linked lists 706 of data nodes. According to an example embodiment, the directory 702 may include an array of pointers pointing to segments 704. According to an example embodiment, each segment 704 may include an array of bucket pointers (e.g., location indicators). According to an example embodiment, each bucket pointer may point to a single linked list 706 of data nodes.

According to an example embodiment, the number of bucket pointers in each segment 704 may be a power of two (e.g., for convenient address computation). According to an example embodiment, segment sizes may increase exponentially (e.g., each additional segment may double in size), thus involving a small number of segments so the directory may fit in the processor cache. According to an example embodiment, an upper limit on the size of a single segment 704 may also be implemented.

As the size of an expansion (contraction) step may be smaller than the size of a segment, some bucket pointers in the last segment may temporarily not be in use. For example, as shown in FIG. 7, the last two of four bucket pointers in the last segment are not in use.

According to an example embodiment, the bucket number may be determined based on a hash key HK, via a thread that may first calculate HK mod N where N is the smallest power of two that is larger than or equal to the number of buckets. If the value is less than the number of buckets, then the thread may return the value. Otherwise, the thread may return HK mod N/2. For example, the hash table as shown in FIG. 7 includes six buckets, and N=8. To search for a record with HK=15, a comparison may be determined between 7 (=15 mod 8) and 6. Since 7≥6, a determination may be made to search in bucket 3 (=15 mod 8/2).

According to an example embodiment, the data nodes may be ordered in recursive split order within a bucket. For example, Table 1 below illustrates hash keys of the four records in bucket 3, and their split-order keys (i.e., bit-reversed values of the hash keys).

TABLE 1

| hash key | hash key (bits) | split-order key |
|---|---|---|
| 3 | 0000 . . . 0011 | 1100 . . . 0000 |
| 11 | 0000 . . . 1011 | 1101 . . . 0000 |
| 7 | 0000 . . . 0111 | 1110 . . . 0000 |
| 15 | 0000 . . . 1111 | 1111 . . . 0000 |

According to an example embodiment, a Linear Hashing, Lock Free (LHlf) hash table may be lock free but not wait free. For example, a single thread may suffer starvation but the system as a whole will make progress nonetheless. According to an example embodiment, threads may help each other, that is, when a thread T1 encounters an incomplete operation it helps to complete the operation regardless of which thread initiated the operation. For example, when scanning the records in a bucket, a thread T1 may encounter a record R that has been marked to be deleted by another thread T2 but R has not yet been unlinked from the linked list. In that case, T1 may help with the deletion by attempting to unlink R. If T1 succeeds, T2 may determine that the delete has been completed when it resumes.

Thus, multiple threads may be competing to complete an operation and it may be determined that the operation is completed once, and no more than once. According to an example embodiment, this may be accomplished via dividing an operation into smaller atomic steps and tracking what steps have been completed. Any thread may attempt the next atomic step. If it succeeds, the thread may record that the step has been completed by changing the state of the target object of the operation. According to an example embodiment, example techniques discussed herein may "do no harm" if the attempt fails. According to an example embodiment, deletion may be divided into "mark node for deletion" and "unlink node" operations.

According to an example embodiment, four types of objects may be targets of an operation: a table, a segment, a bucket, and a node. Each object type may thus be subjected to various states and transitions, as discussed below.

Figure 8:
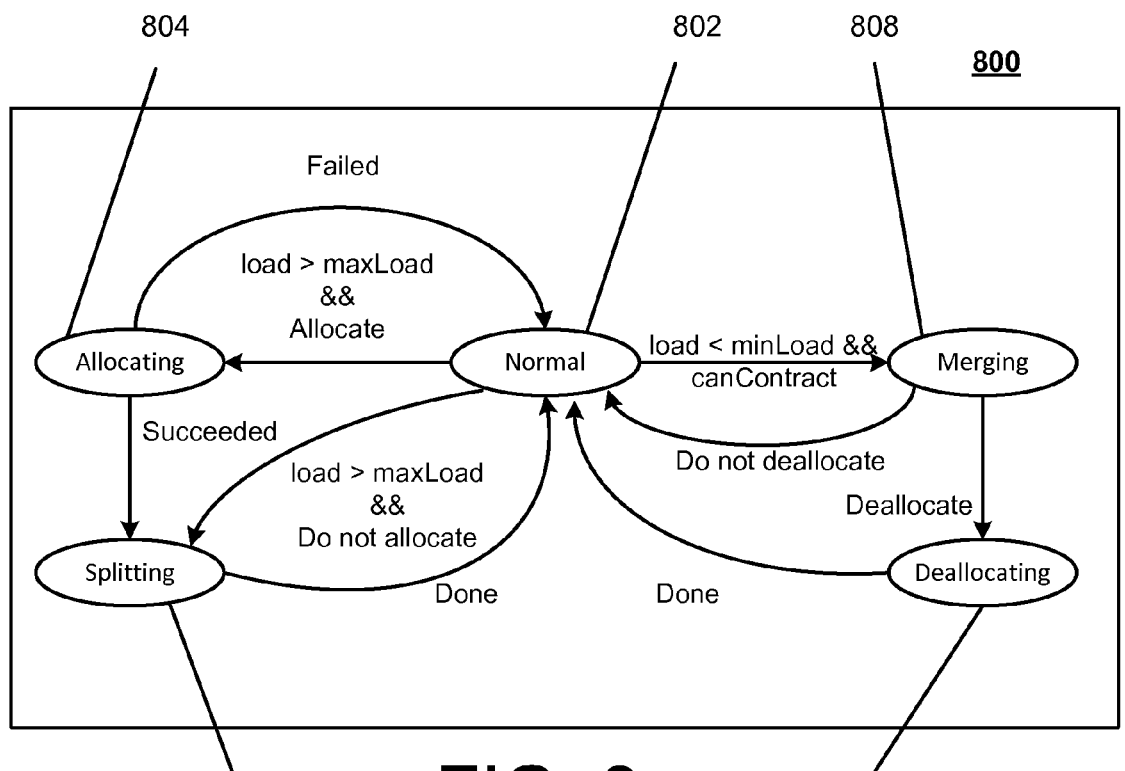
FIG. 8 illustrates states and transitions associated with hash tables, according to an example embodiment.

FIG. 8 illustrates states and transitions associated with hash tables, according to an example embodiment. As shown in FIG. 8, a hash table may be set to one of five example states, including Normal 802, Allocating 804, Splitting 806, Merging 808, or Deallocating 810.

According to an example embodiment, if the table is in the Normal 802 state and a thread detects that the load on the table (e.g., the average number of records per bucket) exceeds some threshold maxLoad, the thread may change the state either to Allocating 804 or Splitting 806, depending on whether the last segment has unused units. While splitting/merging based on average load is discussed herein, one skilled in the art of data processing may appreciate that other policies are possible (e.g., bounding the expected search length), without departing from the spirit of the discussion herein.

According to an example embodiment, when a thread determines that the table is in Allocating 804 state, the thread may request allocation of a new segment. If the allocation is successful, the thread may add an expansion unit by increasing the number of buckets by some expansion unit size, and change the state to Splitting 806; otherwise the state is changed back to Normal 802.

According to an example embodiment, when a thread determines that the table is in the Splitting 806 state, the thread may help by splitting buckets in the expansion unit.

When all bucket splits for the expansion unit have been completed, the table state may be changed to Normal 802.

According to an example embodiment, if the table is in the Normal 802 state and a thread determines that the load of the table is below a predetermined threshold minLoad, the thread may change the state to Merging 808. According to an example embodiment, an exception may be determined when the table has only one segment, in which case the state may remain as Normal 802.

According to an example embodiment, a thread that notices that the table is in the Merging 808 state may help by merging some buckets in the last contraction unit into their parent buckets. When merging of the buckets in the contraction unit is complete, the number of buckets may be decreased, and the table state may be changed to either Normal 802 or Deallocating 810, depending on whether the last segment is still in use.

According to an example embodiment, in the Deallocating 810 state, the last segment may be deallocated, and the table state may be changed to Normal 802.

Figure 9:
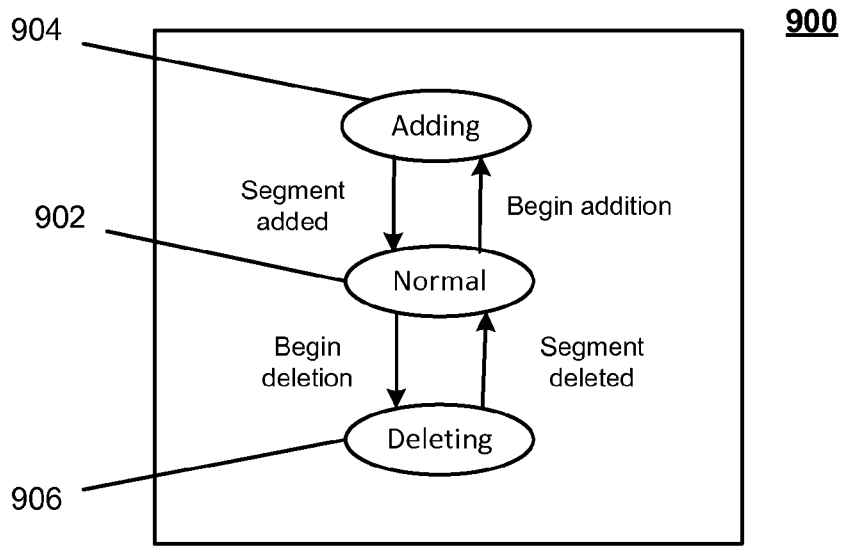
FIG. 9 illustrates example segment pointer states and transitions, according to an example embodiment.

FIG. 9 illustrates example segment pointer states and transitions, according to an example embodiment. As shown in FIG. 9, segment pointers may be set to have three example states, including Normal 902, Adding 904, and Deleting 906. The Adding 904 and Deleting 906 states may be temporary states that may be used while a thread is allocating a new segment or deallocating an unused segment, as discussed further below.

Figure 10:
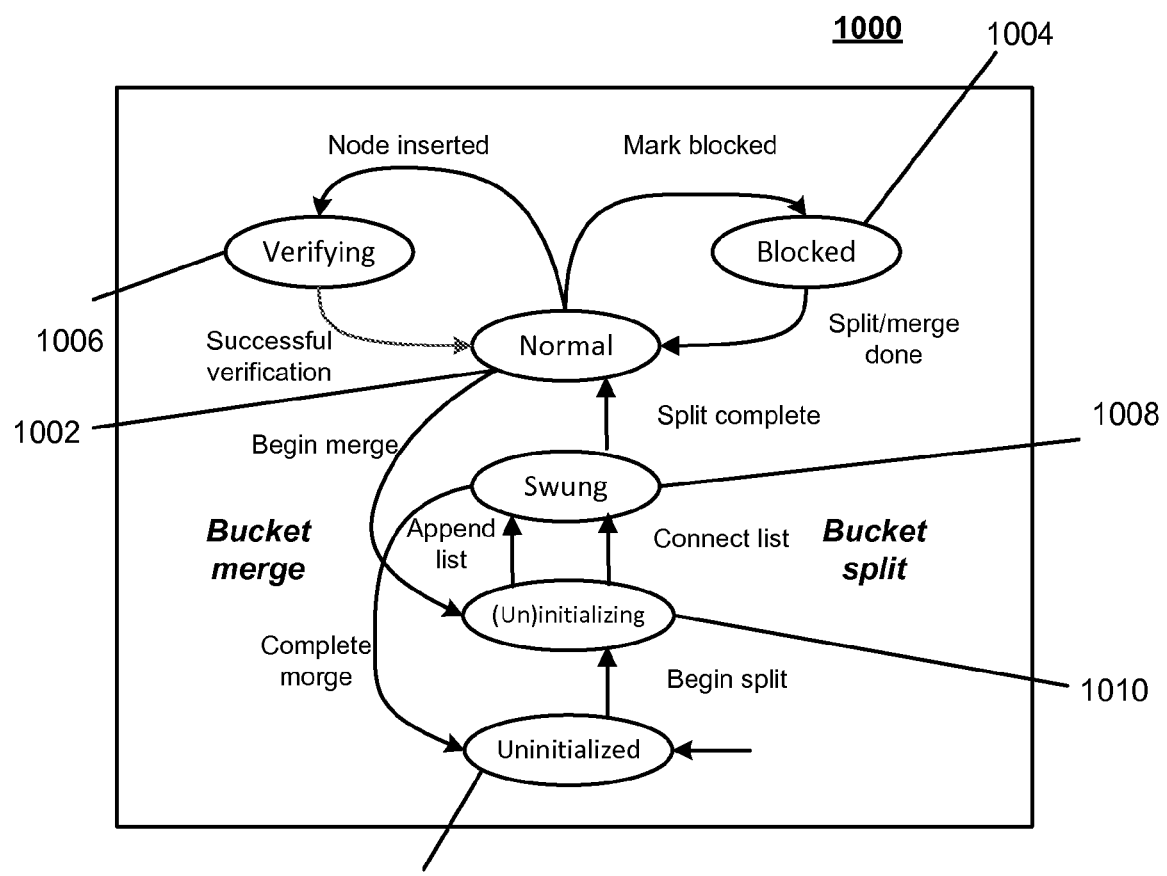
FIG. 10 illustrates example bucket states and transitions, according to an example embodiment.

FIG. 10 illustrates example bucket states and transitions, according to an example embodiment. As shown in FIG. 10, a bucket may be set to have six example states, including Normal 1002, Blocked 1004, Verifying 1006, Swung 1008, (Un)initializing 1010, and Uninitialized 1012.

According to an example embodiment, a bucket may initially be set to the Uninitialized 1012 state. According to an example embodiment, a bucket split may transition a child bucket from Uninitialized 1012 to Normal 1002 in three steps. According to an example embodiment, when the split begins, the child node may be marked Initializing 1012 to signal that the split is underway. Once the split point has been located in the parent bucket, the bucket pointer may be set to point to the first node after the split point, or the first node that belongs to the child bucket. At the same time, the state of the child bucket may be changed to Swung 1008. According to an example embodiment, when the pointer of the last node in the parent bucket has been reset to NULL, the split is complete and the state of the child bucket may be set to Normal 1002.

According to an example embodiment, a bucket merge may transition a child bucket from Normal 1002 to Uninitialized 1012 in three steps. The child bucket may first be marked Uninitializing 1010 to signal that the merge has begun. According to an example embodiment, when the records of the child bucket have been linked in to the parent bucket, the state of the child bucket may be set to Swung 1008. According to an example embodiment, when the merge is complete, the state of the child bucket may be set to Uninitialized 1012.

According to an example embodiment, the Blocked 1004 and Verifying 1006 states may be used for both buckets and nodes, as discussed further below.

Figure 11:
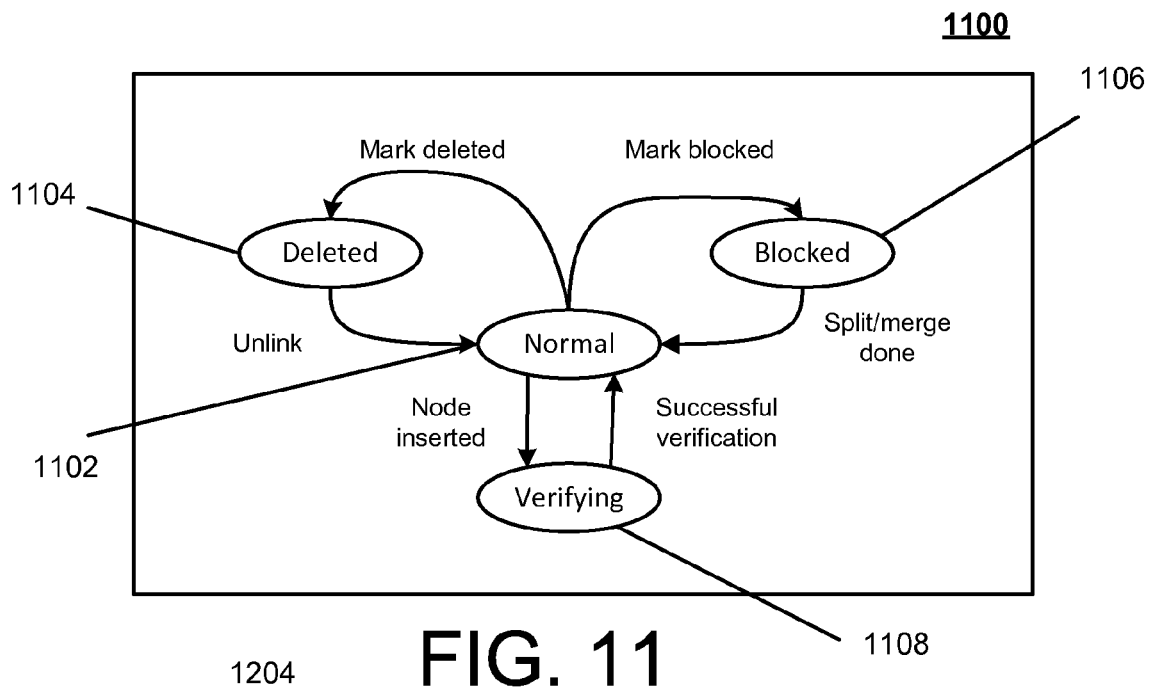
FIG. 11 illustrates example node states and transitions, according to an example embodiment.

FIG. 11 illustrates example node states and transitions, according to an example embodiment. As shown in FIG. 11, a node may be set to have four example states, including Normal 1102, Deleted 1104, Blocked 1106, and Verifying 1108.

According to an example embodiment, a first step in deleting a node may include changing the state of the node from Normal 1102 to Deleted 1104. After that, any thread may unlink the node from the chain and change its state to Normal 1102. However, it may not be desirable to immediately reclaim the space of the deleted node after it has been unlinked, as other threads may continue to have pointers to it. According to an example embodiment, such may be allowed to "drain" before the node is deleted. For example, an example reference counting technique may be used. According to an example embodiment, hazard pointers may also be used.

According to an example embodiment, one step of a bucket split may include locating a point for splitting the parent bucket's chain of records. According to an example embodiment, when the split point is located, the last node to remain in the parent bucket may be marked Blocked 1106. According to an example embodiment, if no nodes are to remain in the parent bucket, the bucket itself may be marked Blocked 1004. For example, marking a node or bucket Blocked may help to stabilize the split point until the split has been completed. According to an example embodiment, when the split has been completed the state is changed to Normal 1102.

According to an example embodiment, the Blocked 1106 state may also be used during a bucket merge. For example, when the merge begins, the last node of the parent bucket may be marked Blocked 1106 to assist in stabilizing the merge point. According to an example embodiment, when the merge is complete the state may be changed back to Normal 1102.

According to an example embodiment, if a new node is inserted while the table is expanding, the node may be placed in an incorrect bucket. According to an example embodiment, such an event may be handled via performance of a "conditional insert", such that the new node may be inserted provisionally into the bucket, and it may then be determined whether the new node is in the correct bucket. To prevent other threads from accessing the node before it is determined to be in the correct bucket, the previous node may be marked Verifying 1108. If the new node is the first on the list, the bucket may be marked Verifying 1006. If verification is successful, the node or bucket state may be changed from Verifying 1108 to Normal 1102. If verification fails, the new node may be unlinked from the bucket and the insert is may be retried.

According to an example embodiment, example data structures may be implemented in accordance with the example techniques, as discussed further below.

According to an example embodiment, table parameters that may be included in the example hash table structure may include example definitions in accordance with:

double maxLoad: predetermined threshold upper bound load before an expansion is triggered double minLoad: predetermined threshold minimal load before a contraction is triggered int firstSegmentSize: the number of buckets in the first segment int maxSegmentSize: the maximum number of buckets in a single segment int unitSize: the number of buckets in an expansion (contraction) unit int directorySize: the capacity of the directory in number of segment pointers According to an example embodiment, example parameters may be included in a 128-bit structure that may be referred to as TableInfo, whose value may be updated atomically:

State state: the hash table's state $\in$ {Normal, Allocating, Deallocating, Splitting, Merging} int numSegments: the number of allocated segments int numUnusedUnits: the number of units, in the last segment, that are not used
int numStateChanges: the number of state changes that have occurred
int fullMask: computed as the smallest power of two that is larger than or equal to the number of buckets minus one; useful in efficient address calculation
int addrCount: the number of buckets in the hash table
int nextBucket: the next bucket (in the last unit) to initialize or uninitialize; the value $\epsilon$ [0, unitSize]

According to an example embodiment, the variables may be included in a 128-bit structure using bit fields. For example, the variable state may be implemented using three bits.

According to an example embodiment, the hash table may store a directory which may be implemented as an array of DirectoryEntry objects. According to an example embodiment, each DirectoryEntry may point (e.g., via location indicators) to a Segment which may include an array of Node pointers. According to an example embodiment, each Node may point to a record and to the next Node in the linked list. According to an example embodiment, example data structures may be illustrated as shown in Table 2 below.

TABLE 2

```
// example Node structure
struct Node {
    void* record;           // pointer to the record
    Node* next;             // the next pointer
};
struct Segment {
    Node* buckets;          // an array of bucket pointers
};
// example Directory structure
struct DirectoryEntry {
    Segment* segment;       // pointer to a segment
    int numBucketsThisSegment;   // #buckets in this segment
    int numBucketsSoFar;    // total #buckets from segment
                                 0 to this segment
};
// Other Variables
int numRecords: the number of records currently stored in
                the hash table
```

According to an example embodiment, a pointer variable may include 64 bits. However, an actual pointer value may not use all bits. Further, memory objects may be aligned on 8-byte boundaries, which leaves three low-order bits unused and equal to zero. Therefore, according to an example embodiment, two or three low-order bits may be available in these pointer variables for storing the state of an object. In addition, seven high-order bits may be used in bucket and node pointers as a mini-counter for example techniques addressing an ABA problem, as discussed below.

According to an example embodiment, bucket and node pointers may provide three low-order bits to represent the states Normal, Verifying, Blocked, Deleted, Swung, (Un) Initializing, and Uninitialized. According to an example embodiment, seven high-order bits of the pointers may be used as a counter.

According to an example embodiment, segment pointers may provide two low-order bits to represent states Normal, Adding, and Deleting.

According to an example embodiment, the state of a table may be stored in the 128-bit TableInfo structure discussed above.

According to an example embodiment, an iterator over a node may include a pointer to a node, and the address of that pointer. In addition, it may include a snapshot of TableInfo. An example structure of an iterator over a node is illustrated in Table 3 below:

TABLE 3

```
// example iterator structure
struct Iterator {
    Node* curr;             // the pointer to a node
    Node** prev;            // the address of the pointer
    TableInfo tableInfo;    // a snapshot of the TableInfo
};
```

According to an example embodiment, an iterator may represent a pointer to a node (e.g., a node curr) in the hash table. According to an example embodiment, storage of the address of the pointer to curr (e.g., prev) may enable the iterator to capture more information about a location in the hash table. For example, using an iterator iter the hash table may insert a node before iter.curr, by setting the new node's next pointer to point to iter.curr and by setting *iter.prev=the new node. The TableInfo snapshot may be used for several purposes, as discussed further below.

According to an example embodiment, there may exist differences between a key, a hash key, and a sort key. For example, each record may be associated with a key (e.g., a string). However, a hash table generally may not understand the semantics of a record or a record key. Generally, a hash table may rely on a user-defined function KeyToHash( ) to convert a key to an integer value referred to as a hash key.

According to an example embodiment, as discussed herein, the bit-reversed value of a hash key may be the sort key, and within each bucket the records may be ordered in ascending (or descending) order on the sort keys. Similarly, the hash table also may rely on a user defined key comparison function.

According to an example embodiment, operations may be determined for creating an example hash table and for inserting, locating, and deleting records. According to an example embodiment, applications may not directly call routines that expand or contract the hash table; such maintenance routines may be called indirectly as side effects of inserting or deleting records.

According to an example embodiment, an example constructor may initialize variables indicated below as:
Set state=Normal;
Set numSegments=1;
Set numUnusedUnits=0;
Set numStateChanges=0;
Set fullMask=firstSegmentSize−1;
Set nextBucket=0;
Set addrCount=firstSegmentSize;
Set numRecs=0;

According to an example embodiment, the constructor may then allocate the directory and the first segment. According to an example embodiment, the constructor may also compute and fill an example numBucketsThisSegment and numBucketsSoFar fields of all the entries in the directory.

In example algorithms shown below, example operations to increment numStateChanges are omitted, with an understanding that such increment occurs along with every compare and swap (CAS) operation to change the table state.

According to an example embodiment, an example Search( ) operation may include several variants tailored to the desires of different callers. The discussion below is directed to a base variant: searching for a record with a given hash key in a specified bucket and stopping the search when encountering a record with a higher sort key. Other example variants of Search( ) are discussed further below.

According to an example embodiment, for a hash key and a bucketNo, the Search( ) operation may positions an iterator on the node matching the specified hash key, or on the immediately next node if the specified hash key does not exist in the bucket. A status code of "found", "not found", or "reorg has occurred" may be returned.

According to an example embodiment, an example algorithm of the Search( ) operation may include: place an iterator at the beginning of the bucket, then repeatedly advance the iterator, until one of the following stopping conditions is met:

(i) a record with a matching hash key is found;
(ii) a record with a higher sort key is encountered;
(iii) the search has reached the end of the bucket;
(iv) a concurrent update has occurred in the bucket; or
(v) the current bucket has been split or merged.

The Search( ) operation restarts the search from the beginning of the bucket in case (iv), and returns in all the other cases (with different return values). In case i, the return status is "found". In case (ii) and (iii), the return value is "not found". In case (v), the return value is "reorg has occurred". A caller of the Search( ) operation may decide how to proceed. For example, if the return status is "reorg has occurred", the caller may recompute the bucketNo and call Search( ) again in the newly computed bucket.

Figure 12A:
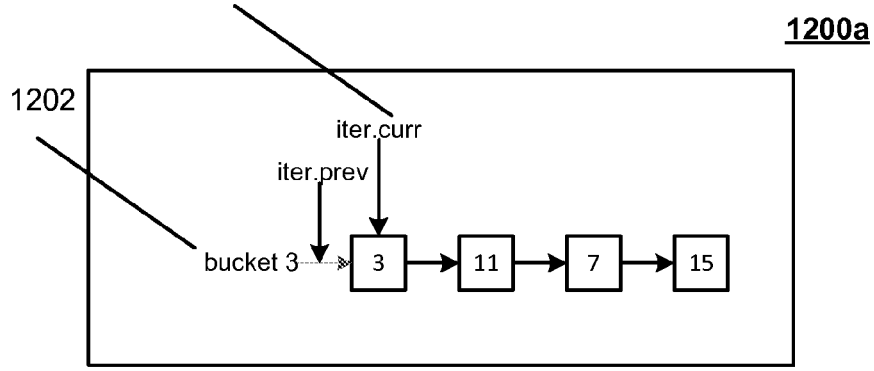
FIGS. 12a-12b illustrate an example search for a hash key in an example hash table.
Figure 12B:
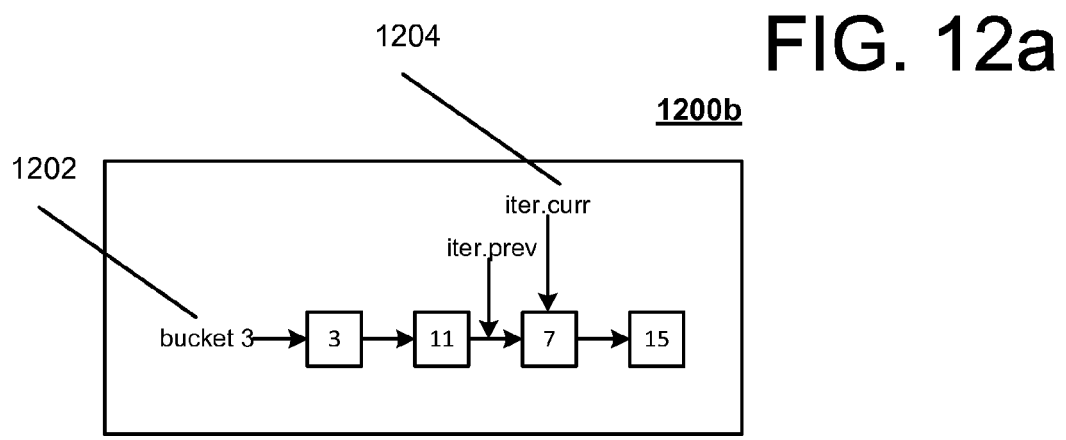

FIGS. 12a-12b illustrate an example search for a hash key in an example hash table. As shown in FIG. 12a, a hash key 27 is searched for in bucket 3 (1202) of the example hash table. As shown in FIG. 12a, an iterator 1204 is placed on the first node of the bucket. The iterator 1204 is repeatedly advanced to the next node, until the node with hash key 7 is reached, as shown in FIG. 12b. Since hash key 7 (sort key= 1110 0000 . . . ) has a higher sort key value than hash key 27 (sort key=1101 1000 . . . ), the search stops with case ii. The iterator 1204 returns with status "not found". If the caller is an insertion thread, it may proceed with inserting a node with hash key 27 immediately preceding iter.curr.

During the search, a thread T1 may encounter a segment pointer, a bucket pointer, or a node pointer that is not in the Normal state. For example, this may indicate that another thread T2 has initiated an operation but it has not yet completed. Thread T1 may wait for T2 to complete the operation, but then T2 may block T1 indefinitely. Thus, according to an example embodiment, T1 may help to complete the in-flight operation (by calling an appropriate action routine) and continue with its search once the state is back to Normal. When T2 resumes, it may determine that the operation has been completed by the change in state. Thus, T1 and T2—and possibly other threads—may compete to complete the operation. For correctness of operations, the end result may be the same as executing the operation once regardless of how the steps of T1 and T2 are interleaved. Thus, the example technique may provide a lock-free structure. Table 4 below illustrates action techniques that may be triggered during an example search.

A determination of which routine is called may be based on a pointer type, its state and/or the table state. Each example routine shown in Table 4 is discussed further herein.

According to an example embodiment, the base variant of the Search( ) operation may perform a search in a bucket and, if the bucket splits or merges, the search may return with status "reorg has occurred". According to an example embodiment, in another variant of Search( ), the bucketNo is not provided, but may be computed from the hash key within the body of the Search( ) technique. If the bucket splits or merges during the search, the bucketNo may be recalculated and the search may be retried in the new bucket.

According to an example embodiment, the base variant may receive a hash key as input, and may terminate the search when a node with a higher sort key is encountered. According to an example embodiment, a node in the hash table may store the record key but not its hash key or sort key. According to an example embodiment, the base variant may utilize an example KeyToHash( ) computation and a ReverseBit( ) computation for every node encountered during the search. However, such computations may be expensive for large keys. According to an example embodiment, a third variant of the Search( ) operation may receive a search key as input and may avoid KeyToHash( ) or ReverseBit( ) computations. For example, a user-defined key comparison technique may be used to compare the search key against record keys. However, this example variant may involve scanning the whole bucket for an unsuccessful search.

According to an example embodiment, for a newNode (e.g., a pointer to a new node), the Insert( ) operation may attempt to insert the new node into the hash table.

According to an example embodiment, an Insert( ) operation may search for the insertion location and then use a CAS operation to link the new node into the chain of nodes. However, immediately before the CAS, bucket splits/merges may have occurred which may result in the new node being inserted into an incorrect bucket. For example, this may occur when the new node is inserted as the last node of the linked list but not when it is inserted in the middle of the list.

Figure 13A:
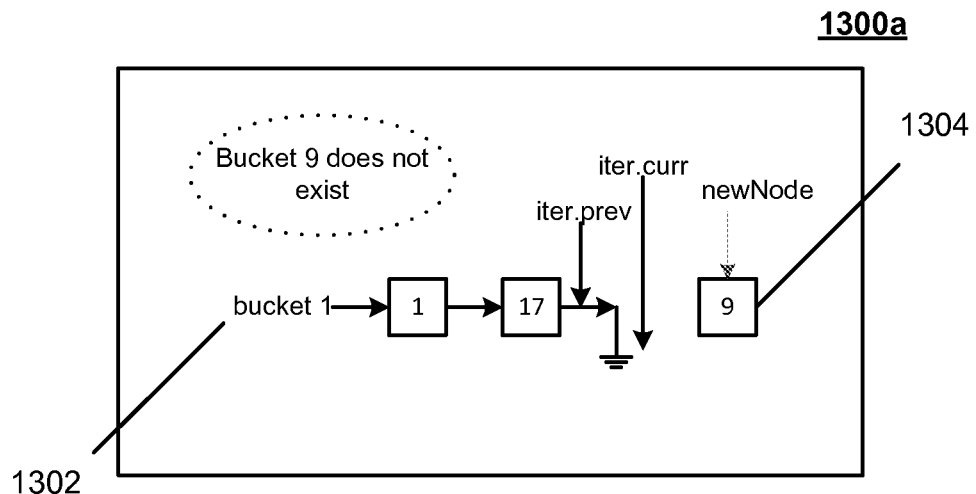
FIGS. 13a-13b illustrate an example scenario for inserting a record in an example hash table.
Figure 13B:
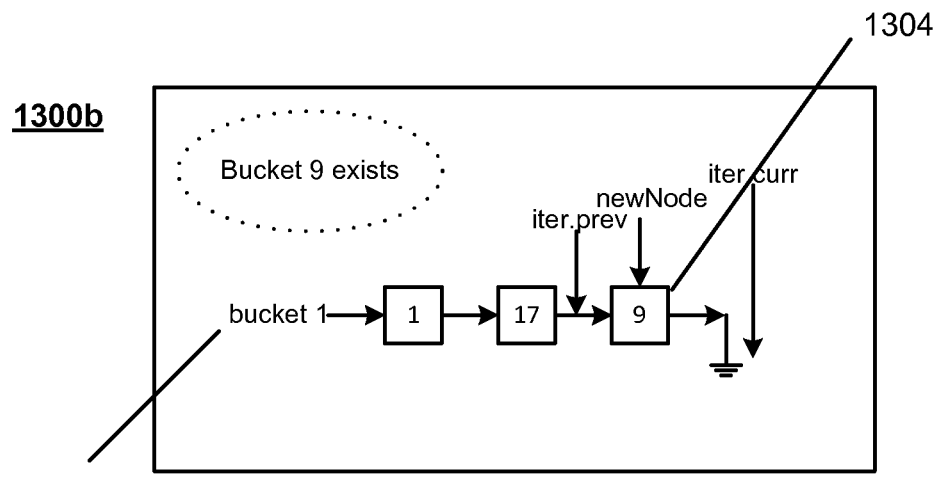

FIGS. 13a-13b illustrate an example scenario for inserting a record in an example hash table. FIG. 13a illustrates an example scenario wherein a record is inserted into a bucket. As shown in FIG. 13a, record 9 may be incorrectly inserted into bucket 1 (1302). As shown in FIGS. 13a-13b, at time 1, the insertion thread correctly determined that the new node with hash key=9 may be inserted at the end of bucket 1 (1302).

However, at time 2, other threads generated a new bucket 9 (1304) by splitting bucket 1. Records 1 and 17 both remained in bucket 1. At time 3, the insertion thread incorrectly inserted the new node into bucket 1 (1302), while it correctly belongs to bucket 9 (1304).

Figure 14:
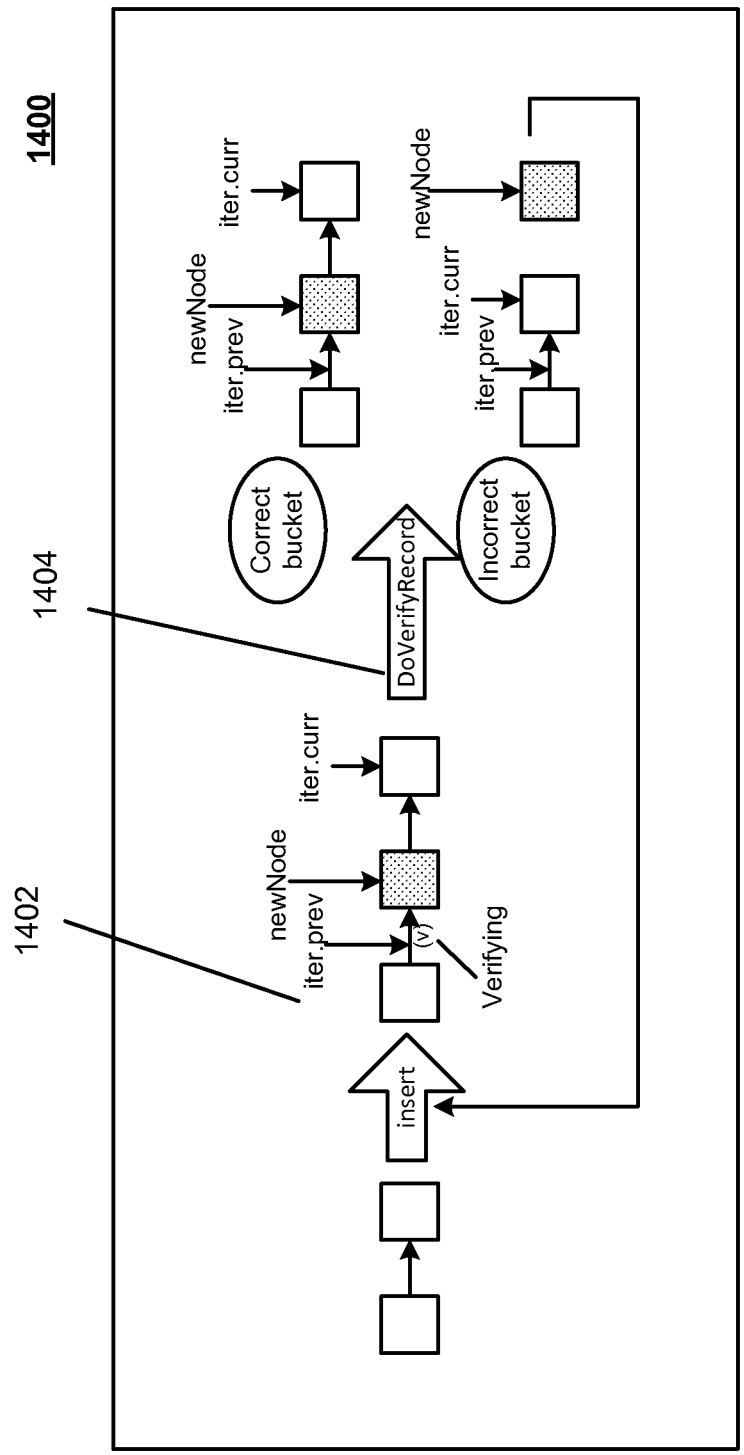
FIG. 14 illustrates an example insertion technique, in accordance with an example embodiment.

According to an example embodiment, the insertion may be performed in two steps. FIG. 14 illustrates an example

TABLE 4

| Pointer type | State | Triggered Routine | Explanation |
| --- | --- | --- | --- |
| Segment | Adding | DoVerifySegment( ) | Add a new segment. |
| Segment | Deleting | DoDeleteSegment( ) | Delete the last segment. |
| Bucket/Node | (Un)Initializing, Swung or Blocked | DoBucketSplit( ) DoBucketMerge( ) | If the table state is Splitting, split the bucket; otherwise, merge the bucket. |
| Bucket/Node | Uninitialized | DoBucketSplit( ) | Split the parent bucket. |
| Bucket/Node | Verifying | DoVerifyRecord( ) | Insert a new record. |
| Bucket/Node | Deleted | DoDeleteRecord( ) | Delete an existing node. | insertion technique, in accordance with an example embodiment. As shown in FIG. 14 the example technique 1400 may include two steps. For example, a first step 1402 may insert the new node but changes the state of the (bucket or node) pointer to the new node from Normal to Verifying. An example second step 1404 may verify whether the node is in the correct bucket. According to an example embodiment, other threads may help to finish an insertion when encountering a pointer that is in the Verifying state.

An example Insert technique is shown in Table 5 below:

TABLE 5

| | |
|---|---|
| // Insert new record | |
| a) | Call Search( ) in the hash table to locate the insertion position of the new record. |
| b) | If a record with the same key already exists in the hash table, return. Otherwise, the iterator iter, used for the search, points to the insertion location. |
| c) | Set newNode−>next = iter.curr. |
| d) | Use a CAS to set (*iter.Prev) = newNode with state being set to Verifying. |
| e) | If the CAS fails, goto Step a to retry. |
| f) | Call DoVerifyRecord( ) to verify the newly inserted node. |

According to an example embodiment, if an iterator iter is provided such that (*iter.prev) is in the Verifying state and points to a newly inserted node whose next node is iter.curr, the example DoVerifyRecord( ) technique may verify whether the new node is in the correct bucket. If so, it changes the state of (*iter.prev) from Verifying to Normal. Otherwise, it removes the new node and reinserts it into the hash table.

According to an example embodiment, an example delete operation may be provided a key, and may attempt to delete the node from the hash table with the matching key. According to an example embodiment, a two-step deletion technique may be used. According to an example embodiment, in a first step, the state of the next pointer in the to-be-deleted node may be changed from Normal to Deleted. In an example second step, a DoDeleteRecord( ) operation may be called to physically unlink and deallocate the node.

According to an example embodiment, regular user threads may participate in maintaining the example hash table. Thus according to an example embodiment, there may be no separate housekeeping threads. According to an example embodiment, when a thread has completed an Insert( ), Search( ) or Delete( ) operation, it may check the state of the hash table. If the state is Normal, the thread may check the load on the table. According to an example embodiment, if the load exceeds a predetermined threshold maxLoad, the thread may trigger an expansion. If the load is below a predetermined threshold minLoad, the thread may trigger a contraction. According to an example embodiment, if the table is in any other state, a maintenance operation may be in progress and the thread may help complete the operation. For example, if the table is in the Splitting state, the thread may help completing the expansion by splitting one or more buckets.

According to an example embodiment, checking on every Insert( ), Search( ), or Delete( ) operation may ensure swift adjustments of the table size, but may add unacceptable overhead to each operation. According to an example embodiment, to reduce the overhead, and also reduce interference among threads, checks may be initiated less frequently.

According to an example embodiment, the maintenance routines associated with table states may also be triggered periodically, to provide overall system progress. For example, if a thread initiated an expansion but for some reason paused indefinitely in the middle of allocating a new segment, the DoAllocate( ) routine may be called by another thread to complete the allocation operation. However, the original thread may be given some time to complete the allocating job, rather than having multiple threads "impatiently" allocating their own copy of a segment and competing to insert it into the directory.

According to an example embodiment, after each Insert( ), Delete( ), or Search( ) operation, the thread may call the function PacedTrigger( ), as discussed further below. According to an example embodiment, the thread may first increment a global counter, and may then trigger an example action routine, depending on the table state, if the modulo of the counter to some pace value is zero. According to an example embodiment, the DoAllocate( ) routine may be triggered at a slower pace, based on a larger predetermined pace value.

Table 6 below illustrates an example PacedTrigger( ) technique:

TABLE 6

```
// PacedTrigger( )
const int paceNormal = 10;
const int paceAllocate = 1000;
const int paceDeallocate = 10;
const int paceSplit = 3;
const int paceMerge = 3;
int counter=0;          // global variable
void PacedTrigger( )
{
    counter++;
    switch (state )
    {
    case Normal:
            if (counter%paceNormal==0)      DoNormal( ); break;
    case Allocating:
            if (counter%paceAllocate==0)    DoAllocate( ); break;
    case Splitting:
            if (counter%paceSplit==0)       DoUnitSplit( ); break;
    case Merging:
            if (counter%paceMerge==0)       DoUnitMerge( ); break;
    case Deallocating:
            if (counter%paceDeallocate==0)  DoDeallocate( ); break;
    }
}
```

According to an example embodiment, an example DoNormal( ) technique may be called when the table state is Normal to trigger a table expansion or contraction if needed. According to an example embodiment, the technique may not accept any parameters, as shown in Table 7 below.

TABLE 7

| | | | |
|---|---|---|---|
| // DoNormal( ) | | | |
| a) | Set load = numRecords divided by addrCount. | | |
| b) | If load > maxLoad | | // start an expansion |
| | i) | If numSegments==directorySize, return. | |
| | ii) | If numUnusedUnits > 0 | // still space in the last segment |
| | | (1) Use a CAS to change the table's state to Splitting, decrement numUnusedUnits, and set nextBucket = 0. | |
| | | (2) Call DoUnitSplit( ) | // start splitting buckets |
| | iii) Else | | |
| | | (1) Use a CAS to change the table's state to Allocating. | |
| | | (2) Call DoAllocate( ) | // allocate a new segment |
| c) | Else If load < minLoad | | // start a contraction |
| | i) | If numSegments==1, return; | |
| | ii) | Use a CAS to change the table's state to Merging and set nextBucket = 0. | |
| | iii) | Call DoUnitMerge( ) | |

According to an example embodiment, when a hash table's load exceeds a predetermined threshold maxLoad, an expansion may be triggered. According to an example embodiment, two expansion states of the hash table may be used in an example technique discussed herein, the expansion states including Allocating and Splitting. According to an example embodiment, the Allocating state, as implemented in the DoAllocate( ) technique, may be employed in allocation of a new segment. According to an example embodiment, the Splitting state, as implemented in the DoUnitSplit( ) technique, may be employed to initialize a unit of newly added buckets, by splitting their parent buckets. According to an example embodiment, to split one bucket, DoBucketSplit( ) may be called.

According to an example embodiment, example hash tables discussed herein may be expanded by a unit of buckets (e.g., 128 buckets) at a time, instead of one bucket at a time, to increase parallelism. According to an example embodiment, all of the 128 buckets may be added to the hash table at the same time. According to an example embodiment, multiple threads may split multiple buckets in parallel.

Figure 15:
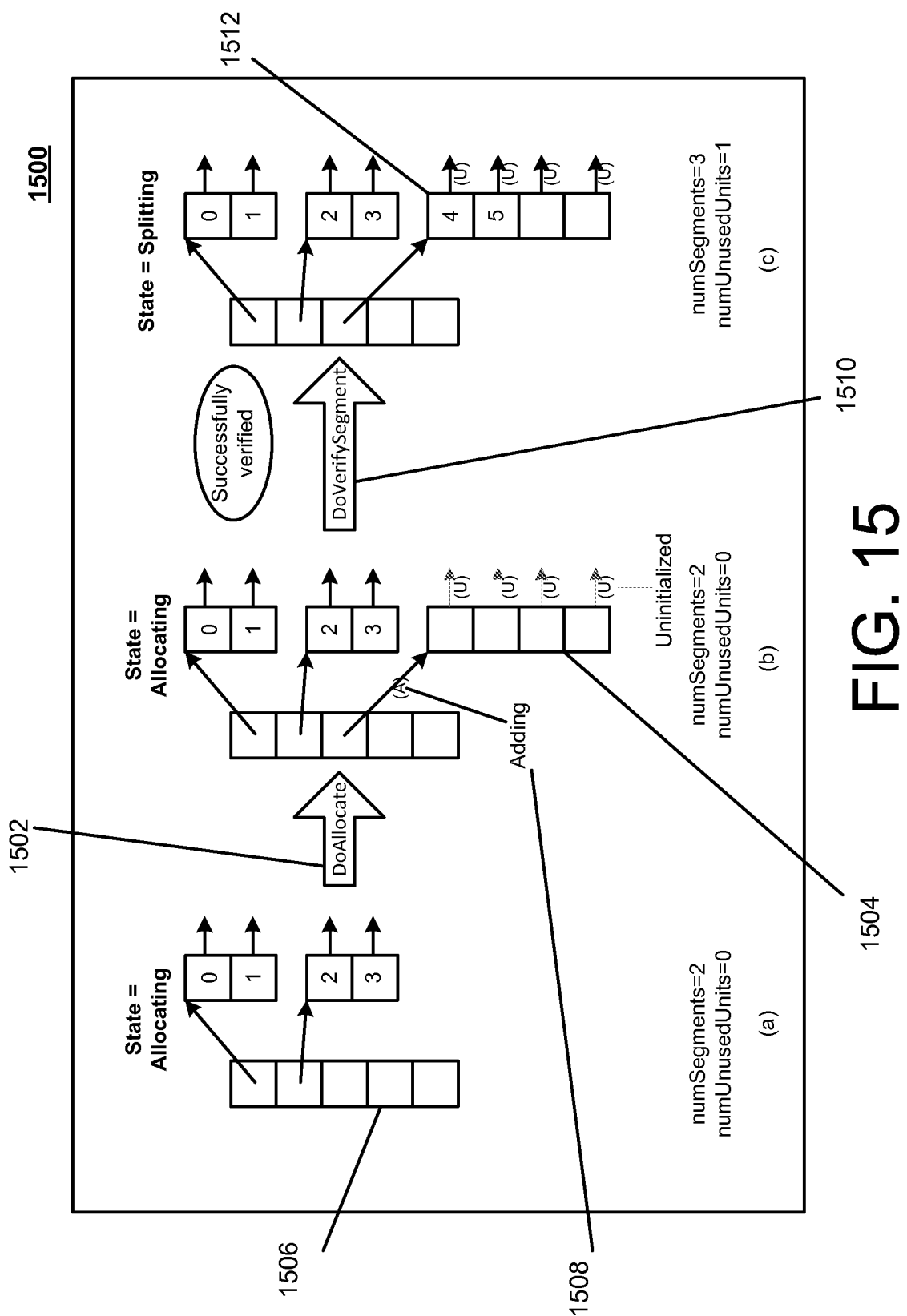
FIG. 15 illustrates example steps of an example allocation technique, according to an example embodiment

According to an example embodiment, an example DoAllocate( ) technique may be called when the table's state is Allocating to allocate a new segment. FIG. 15 illustrates example steps of the example DoAllocate( ) technique, according to an example embodiment. According to an example embodiment, preconditions for DoAllocate( ) may include:

table state is Allocating;
the directory is not full, i.e. numSegments<directorySize;
the last segment is full, i.e. numUnusedUnits=0; or
the next element in the directory has a NULL segment pointer.

According to an example embodiment, while a thread T1 is attempting to add a newly allocated segment into the directory, concurrent updates may have modified the table so the new segment is no longer in use. For instance, after T1 adds the new segment and is trying to use it, another thread may attempt to deallocate the new segment. It is also possible that the table has contracted so the previous segment is no longer full. It is also possible that the previous segment has been deallocated already in which case adding the new segment may generate a hole in the directory.

According to an example embodiment, an example two-step technique may be employed, as shown in FIG. 15. According to an example embodiment, a first step 1502 may add a new segment 1504 to a directory 1506, but may set the state of the pointer to the segment to Adding 1508. A second example step 1510 may verify the validity of the new segment 1504, and may either keep the new segment and start using it if it is valid, or may remove the segment if it is invalid. According to an example embodiment, a segment in the Adding state may be removed because no thread may store bucket pointers into the segment. According to an example embodiment, other threads may help to complete the allocation job if they encounter a segment pointer that is in the Adding state.

According to an example embodiment, the example DoAllocate( ) technique (the first step 1502) may be illustrated as shown in Table 8 below.

TABLE 8

// DoAllocate( )
a) Allocate a new segment, and set the state of all the bucket pointers in the new segment to Uninitialized.
b) If the allocation fails, change the table's state to Normal and return.
c) Use a CAS to append the segment to the end of the directory, setting the state of the segment pointer to Adding.
d) If the CAS is successful, call DoVerifySegment( ); otherwise, delete the segment.

According to an example embodiment, the second step 1510 shown in FIG. 15 may be implemented as an example DoVerifySegment( ) technique. According to an example embodiment, the example DoVerifySegment( ) technique may accept as a parameter the array index in the directory 1506 that corresponds to the new segment 1504 that is in the Adding state. According to an example embodiment, preconditions (as illustrated in FIG. 15) may include:

table state is Allocating;
the directory is not full, i.e. numSegments<directorySize; or
the last segment is full, i.e. numUnusedUnits=0.

According to an example embodiment, the next element in the directory, after the last segment, may include a segment pointer in the Adding state.

According to an example embodiment, an example technique for implementing DoVerifySegment( ) is illustrated in Table 9 as shown below.

TABLE 9

// DoVerifySegment( )
a) Verify the preconditions. If they do not all hold, remove the new segment, deallocate it, and return.
b) Set the segment pointer's state to Normal.
c) Use a CAS to change the table's state to Splitting, increment numSegments, set numUnusedUnits = the capacity of the segment, in number of units, subtracted by 1, and set nextBucket = 0.
d) if the CAS is successful, call DoUnitSplit( )

According to an example embodiment, an example DoUnitSplit( ) technique may called when the table's state is Splitting to split the parent buckets of the (child) buckets in a newly added unit of buckets.

FIGS. 16*a*-16*c* illustrate a scenario of splitting parent buckets, according to an example embodiment. As shown in FIG. 16*a*, a unit 1602 of buckets has been added to a hash table in DoVerifySegment( ). As shown in FIG. 16*a*, the unit 1602 may correspond to the top 2 buckets 1512 in the third segment in the successfully verified state shown in FIG. 15. Although unitSize=2 in FIG. 15, the example of FIGS. 16*a*-16*c* are shown with a larger unitSize.

According to an example embodiment, pre-conditions (as shown in FIG. 16*a*) may include:

table state is Splitting;
nextBucket=0; or
the buckets in this unit are all in the Uninitialized state.

According to an example embodiment, during the splitting phase (as shown in FIG. 16*b*, any bucket with a local bucketNo less than nextBucket may be determined to be in the Normal state. According to an example embodiment, buckets in the range [nextBucket, unitSize-1] may be in any of the four states that include Uninitialized, Initializing, Swung, or Normal. According to an example embodiment, when the splitting phase finishes (as shown in FIG. 16*c*), nextBucket=unitSize, such that all the buckets in the unit have been initialized. The table's state may then be changed to Normal.

According to an example embodiment, an example technique for DoUnitSplit( ) may be illustrated as shown in Table 10 below.

TABLE 10

// DoUnitSplit( )
a) Keep increasing nextBucket either until the bucket it references is not in the Normal state or until TABLE 10-continued nextBucket==unitSize.
b) If nextBucket==unitSize, all the buckets have been initialized. Change the table state to Normal and return.
c) Select a bucket to initialize.
d) Call DoBucketSplit( ) to initialize the selected bucket by splitting its parent bucket.
e) Go to Step a.

According to an example embodiment, different policies may be used for selecting a bucket in step 3 of DoUnitSplit( ). According to an example embodiment, a first choice may include the bucket whose number is equal to or slightly larger than nextBucket and whose number modulo the number of CPUs is equal to the CPU ID that the current thread is running on. If that bucket has been initialized or does not exist, nextBucket may be selected.

According to an example embodiment, an example DoBucketsplit( ) technique may perform a bucket split. According to an example embodiment, dobucketsplit( ) may initialize a child bucket by splitting the corresponding parent bucket. According to an example embodiment, DoBucketsplit( ) may accept as a parameter the child bucket number. According to an example embodiment, another version of DoBucketSplit( ) which may accept as a parameter an iterator in the parent bucket, as discussed further below.

According to an example embodiment, example pre-conditions for DoBucketSplit( ) may include:
 a. table state is Splitting;
 b. the given child bucket is not in the Normal state.

FIG. 17 illustrates example state transitions of a bucket in initialization, according to an example embodiment. As shown in FIG. 17, the bucket is Uninitialized 1702. As discussed previously, all bucket pointers may be Uninitialized in a newly allocated segment. According to an example embodiment, the DoBucketSplit( ) technique may change the bucket's state to Initializing 1704. In this state, the splitting location in the parent bucket may be identified and stabilized (e.g., Blocked).

When the DoBucketSplit( ) technique swings the child bucket's pointer to an acceptable node in the parent bucket, the child bucket's state may be set to Swung 1706 (e.g., in the same CAS operation). In this state, the DoBucketSplit( ) technique may reset the next pointer in the last node in the parent bucket to NULL.

As a last step, the child bucket's state may be changed to Normal 1708.

FIGS. 18a-18f illustrate example steps of splitting a bucket, according to an example embodiment. As shown in FIGS. 18a-18f, bucket 2 (1802) may be split, thereby initializing a new bucket 6 (1804) in an example hash table.

According to an example embodiment, a thread that executes DoBucketSplit( ) may check the bucket's state to determine a starting point. For example, if the child bucket pointer is in the Swung state, the thread may infer that the child bucket pointer has already been swung, and the thread may thus start its execution by trying to unblock the split point in the parent bucket. Additionally, at each step, the CAS operation may fail, and such failures may be correctly handled. Furthermore, ABA issues may arise.

According to an example embodiment, an example DoBucketSplit( ) technique may be illustrated as shown in Table 11 below. As discussed previously, the split point of a bucket may refer to the last node that is to remain in a parent bucket. The node immediately after the split point may then become the first node of the child bucket.

TABLE 11

// DoBucketSplit( )
a) Check the child bucket's state.
 i) If the state is Uninitialized, go to Step b;
 ii) Else if the state is Initializing, search for the split point in the parent bucket and go to Step c;
 iii) Else if the state is Swung, search for the split point in the parent bucket and go to Step d;
 iv) Else if the state is Normal, return.
b) // Uninitialized
 i) Use a CAS to change the child bucket's state from Uninitialized to Initializing. Upon failure, go to Step a.
 ii) Search for the split point in the parent bucket and go to Step c.
c) // Initializing
 i) If the split point in the parent bucket is not Blocked
  (1) Use a CAS to change the split point state to Blocked. Upon failure, go to Step a.
 ii) Swing the child bucket pointer to the first node that should belong to the child bucket, while changing the child bucket's state to Swung. Upon failure, go to Step a.
d) // Swung
 i) If the split point in the parent bucket is Blocked
  (1) Swing the next pointer in the last node of the parent bucket to NULL, while changing the pointer's state from Blocked to Normal.
 ii) Use a CAS to change the child bucket's state from Swung to Normal.

TABLE 12

| Time | Thread T1 | Thread T2 |
| --- | --- | --- |
| 1 | Determines that the splitting location in the parent bucket is not blocked. | Determines that the splitting location in the parent bucket is not blocked. |
| 2 | Blocks the splitting location. | |
| 3 | Finishes splitting, including unblocking the splitting point in the parent bucket. | |
| 4 | | Marks the splitting location BLOCKED. |

According to an example embodiment, the example DoBucketSplit( ) technique may deteriorate due to ABA issues, as illustrated in Table 12 shown above. For example, two threads T1 and T2 may attempt to initialize the same bucket. At time 1 both threads may reach step 3 of the DoBucketSplit( ) technique shown in Table 11, and they may each make a determination to block the splitting point in the parent bucket. At time 2 and 3, T1 may finish splitting the bucket while T2 may be sleeping. T1 may block and then unblock the splitting location. When T2 wakes up at time 4, it may incorrectly block the splitting location again.

This situation illustrates an example issue that may be referred to as an ABA issue. According to an example embodiment, the situation may be resolved by employing a mini-counter, implemented by borrowing a few high order bits from the pointer that indicates the splitting location. At time 1, both threads may take a snapshot of the value of the mini-counter. At time 2, T1 may successfully block the splitting location, as the splitting location's mini-counter may be equal to the snapshot that T1 took. While blocking the splitting location, T1 may increment the mini-counter. At time 3 when T1 unblocks the splitting location, the mini-counter may be incremented again. At time 4, T2 will fail to block the splitting location because the value of the mini-counter has changed.

According to an example embodiment, another version of DoBucketSplit( ) may allow a thread that encounters a bucket (or node) pointer in the Blocked state to help complete the corresponding splitting operation. This example version of the DoBucketSplit( ) technique may accept as input an iterator. However, the example technique is a subset of the steps in the implementation of the previously discussed version of DoBucketSplit( ) as the child bucket's state may be either Initializing or Swung, as the split point in the parent bucket may be blocked in these states.

According to an example embodiment, when the load on the hash table falls below a predetermined threshold min-Load, a contraction may be triggered. According to an example embodiment, two contraction states of the hash table may include Merging and Deallocating. According to an example embodiment, the Merging state, as implemented in an example DoUnitMerge( ) technique, may merge a unit of buckets with their parent buckets. According to an example embodiment, the Deallocating state, as implemented in an example DoDeallocate( ) method, may deallocate an empty segment. According to an example embodiment, an example DoBucketMerge( ) technique may be called to called merge a bucket.

According to an example embodiment, an example DoUnit Merge technique may be called when the table's state is Merging, in order to merge the buckets in the last unit of the hash table with their parent buckets.

Figures 19A, 19B, 19C:
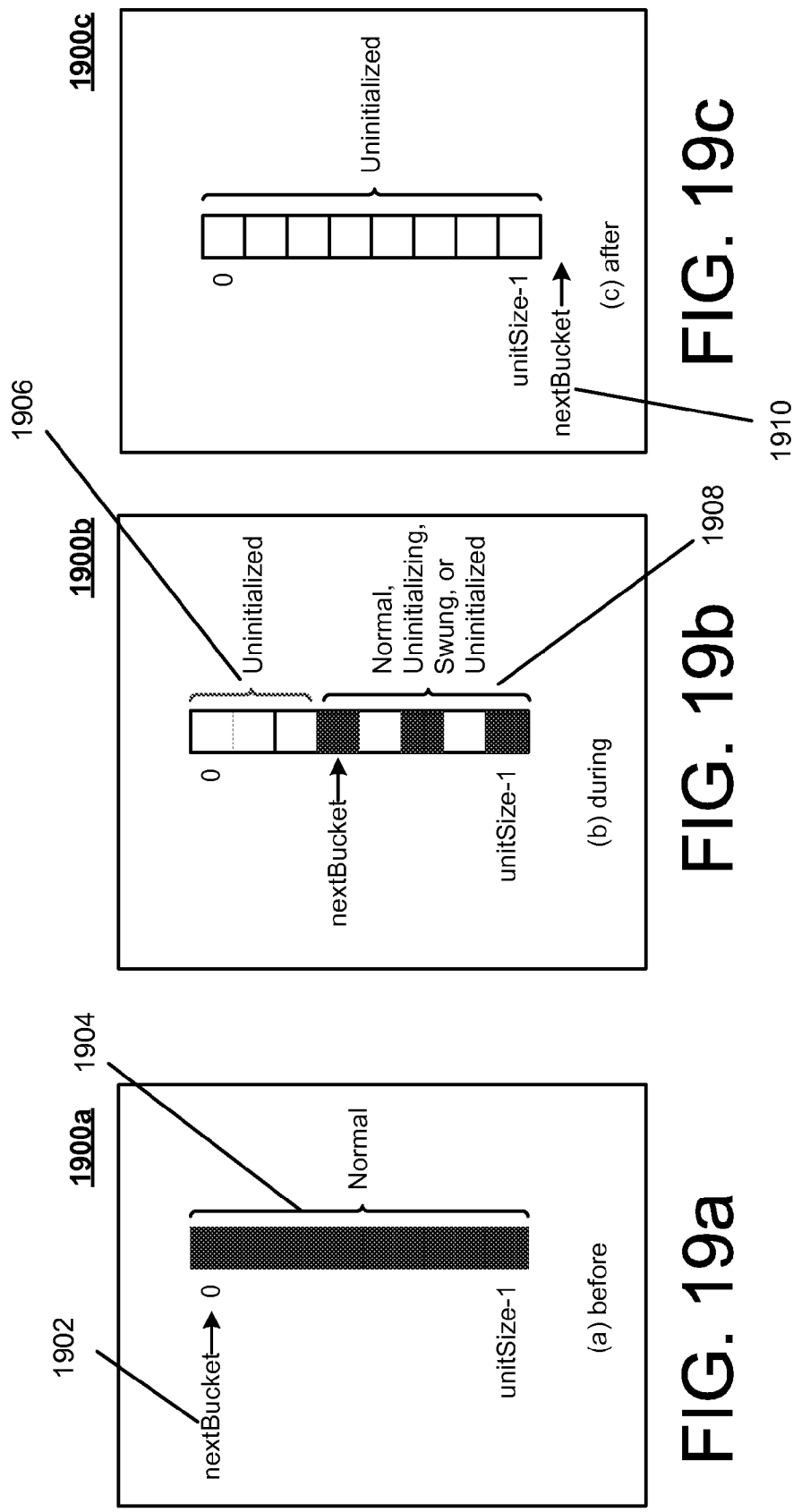
FIGS. 19a-19c illustrate a scenario before, during, and after merging a unit of buckets.

FIGS. 19*a*-19*c* illustrate a scenario before, during, and after merging a unit of buckets. According to an example embodiment, example pre-conditions for the example DoUnitMerge technique (as shown in FIG. 19*a*) may include:

a. Table state is Merging;
b. nextBucket=0;
c. the buckets in this unit are all in the Normal state.

As shown in FIG. 19*a*, the nextBucket value 1902 is indicated as zero, and the state 1904 of the buckets is indicated as Normal. According to an example embodiment, during a merging phase (as shown in FIG. 19*b*), buckets with a local bucketNo less than nextBucket may be in the Uninitialized state 1906. The buckets in the range [nextBucket, unitSize−1] may be in any of the four states that include Normal, Uninitializing, Swung, or Uninitialized 1908.

According to an example embodiment, when the merging phase is complete (as shown in FIG. 19*c*), nextBucket=unitSize 1910, indicating that all the buckets in the unit have been merged into their parent buckets. The table state may then be changed to Normal.

According to an example embodiment, an example DoUnitMerge( ) technique may be illustrated as shown in Table 13 below.

TABLE 13

```
// DoUnitMerge( )
a)   Keep increasing nextBucket either until the bucket it
     references is not in the Uninitialized state, or until
     nextBucket= =unitSize.
b)   If nextBucket= =unitSize, all the buckets have been merged.
     i)   if numUnusedUnits + 1 < the capacity of the last segment
          in number of units,
          (1)  Use a CAS to change the table's state to Normal, and
               increment numUnusedUnits.
     ii)  else
          (1)  Use a CAS to change the table's state to Deallocating,
               decrement numSegments, and set numUnusedUnits =
               0.
          (2)  Call DoDeallocate( ) to deallocate the empty segment.
     iii) Return.
c)   Select a bucket to merge.
d)   Call DoBucketMerge( ) to merge the selected bucket with its
     parent bucket.
e)   Go to Step a.
```

Similarly to DoBucketSplit( ) an example policy for selecting a bucket in step 3 may be determined. According to an example embodiment, the policy discussed above with regard to DoBucketSplit( ) may be used.

According to an example embodiment, an example DoDeallocate technique may be called when the table's state is Deallocating, to deallocate a segment. According to an example embodiment, the example DoDeleteSegment technique may be included as a first step 2002 of deallocating a new segment, as shown in FIG. 20. According to an example embodiment, example preconditions (as shown in FIG. 20, part (a), where numSegments=2), may include:

a. table state is Deallocating;
b. the directory is not full, i.e. numSegments<directorySize;
c. the last segment is full, i.e. numUnusedUnits=0;
d. the next element in the directory has a segment pointer which is not NULL.

According to an example embodiment, an example DoDeallocate( ) technique may be illustrated as shown in Table 14 below.

TABLE 14

```
// DoDeallocate( )
a)   Use a CAS to change the state of the segment pointer located
     immediately after the last segment in the directory to Deleting.
b)   If the CAS is successful, call DoDeleteSegment( ) to verify and
     delete the segment from the directory.
```

According to an example embodiment, the example DoDeleteSegment technique may be included as a second step 2004 of deallocating a new segment, as shown in FIG. 20. According to an example embodiment, the example DoDeleteSegment technique may accept as a parameter the array index in the directory that corresponds to the segment pointer 2006 that is in the Deleting state.

According to an example embodiment, the preconditions (as illustrated in FIG. 20) may include the same preconditions as those discussed previously with regard to the example DoDeallocate( ) technique, with a difference that the segment for deletion may be in the Deleting state.

According to an example embodiment, the example DoDeleteSegment technique may be illustrated as shown in Table 15 below.

TABLE 15

```
// DoDeleteSegment
a)   Verify the preconditions. If they do not all hold, change the
     state of the segment pointer to Normal, and return.
b)   Use a CAS to remove the segment from the directory.
c)   If the removal is successful, physically delete the segment.
```

According to an example embodiment, an example DoBucketMerge( ) technique may be called to uninitialize a child bucket and merge its linked list of data nodes to the end of a parent bucket. According to an example embodiment, the example DoBucketMerge( ) technique may accept as a parameter the child bucket number. According to an example embodiment, another example version of DoBucketMerge( ) may accept as a parameter an iterator in the parent bucket, as discussed further below.

According to an example embodiment, example pre-conditions for the example DoBucketMerge( ) technique may include:

a. table state is Merging;
b. the given child bucket is in the Normal state.

FIG. 21 illustrates example state transitions of a bucket being uninitialized, according to an example embodiment. As shown in FIG. 21, the bucket may initially be in the Normal state 2102. According to an example embodiment, the example DoBucketMerge( ) technique may change the state of the bucket to Uninitializing 2104. In this state, the state of the last node in the parent bucket may be set to Blocked.

According to an example embodiment, the example DoBucketMerge( ) technique may connect the nodes of the child bucket to the end of the parent bucket and change the state of the child bucket to Swung 2104. As a last step, the example DoBucketMerge( ) technique may reset the child bucket pointer to NULL, while changing its state to Uninitialized 2108.

Figure 22B:
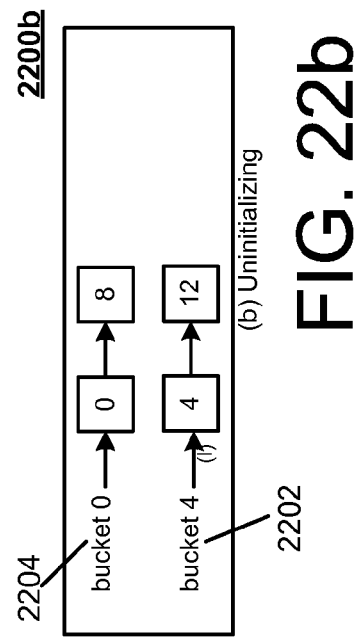
FIGS. 22a-22f illustrate example steps of merging a child bucket with its parent bucket, according to an example embodiment.
Figure 22A:
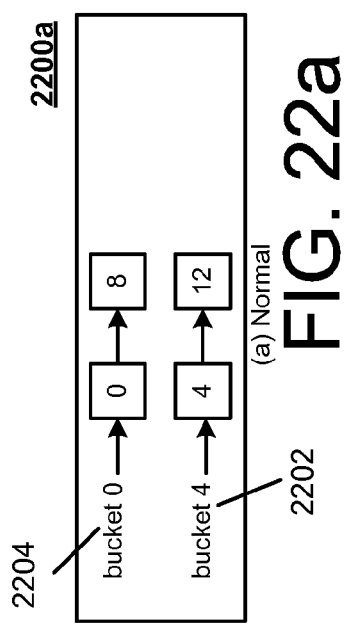
Figure 22D:
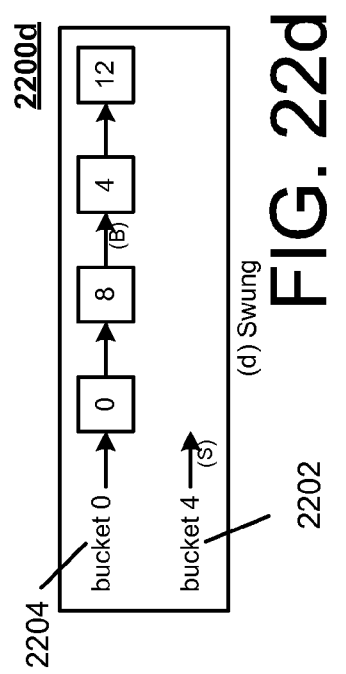
Figure 22C:
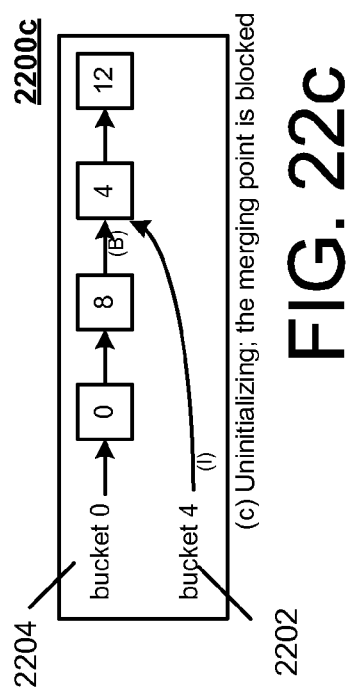
Figure 22F:
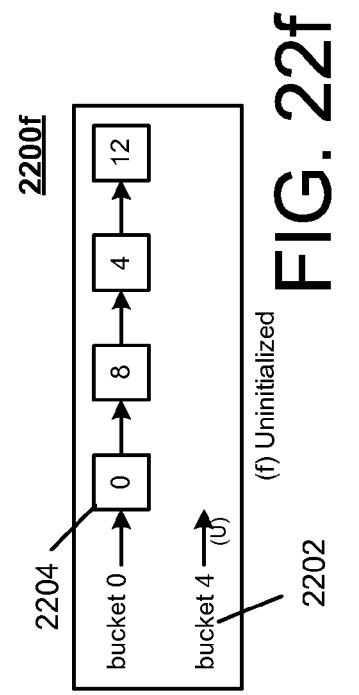
Figure 22E:
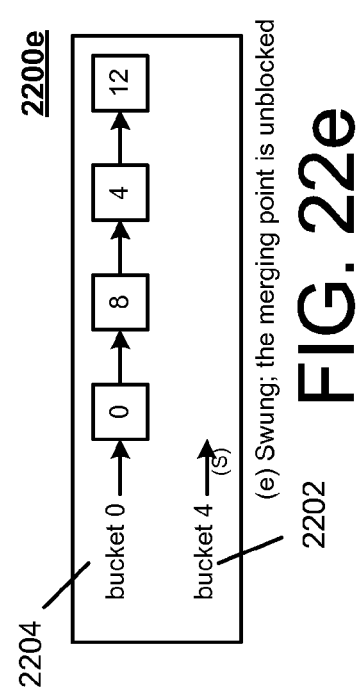

FIGS. 22a-22f illustrate example steps of merging a child bucket with its parent bucket, according to an example embodiment. For example, a child bucket 4 (2202) may be merged with its parent bucket 0 (2204), as shown in FIG. 22a.

According to an example embodiment, an example DoBucketMerge( ) technique may be illustrated as shown in Table 16 below. The merge location may include either the last node of the parent bucket or, if the bucket is empty, the bucket itself.

TABLE 16

```
// DoBucketMerge( )
a)   Check the child bucket's state.
     i)   If the state is Normal, go to Step b;
     ii)  else if the state is Uninitializing, locate the merge location
          in the parent bucket and go to Step c;
     iii) else if the state is Swung, locate the merge location in the
          parent bucket and go to Step d;
     iv)  else if the state is Uninitialized, return.
b)   // Initialized
     i)   Use a CAS to change the child bucket's state to
          Uninitializing. Upon failure, go to Step a.
     ii)  Locate the merge location in the parent bucket and go to
          Step c.
c)   // Uninitializing
     i)   If the merge location pointer is not Blocked
          (1)   Use a CAS to swing the pointer to point to the first
                node in the child bucket, while setting its state to
                Blocked. Upon failure, go to Step a.
     ii)  Swing the child bucket pointer to NULL, while changing
          its state to Swung. Upon failure, go to Step a.
d)   // Swung
     i)   If the merge location pointer is Blocked
          (1)   Use a CAS to change the merge location pointer to
                Normal.
     ii)  Use a CAS to set the child bucket's state to Uninitialized.
```

According to an example embodiment, another version of the example DoBucketMerge( ) technique may allow a thread that encounters a bucket (or node) pointer that is in the Blocked state to help complete the corresponding merging operation. This version of the example DoBucketMerge( ) technique may accept as input an iterator. The algorithm steps, however, may be a subset of the steps in the implementation of the previously discussed version of DoBucketMerge( ) the state of the child bucket may either Uninitializing or Swung, as the merge location in the parent node may be blocked in these states.

When encountering a pointer that is in the Blocked state a thread may determine whether the pointer is blocked for splitting or merging. This may be determined by checking whether the table state is Splitting or Merging.

Example techniques discussed herein may thus provide an example lock-free hash table based on linear hashing that may support both expanding and contracting the hash table, as discussed above.

Implementations of the various techniques described herein may be implemented in digital electronic circuitry, or in computer hardware, firmware, software, or in combinations of them. Implementations may implemented in a propagated signal, or, alternatively, as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a processor; and
a hash table manager embodying executable instructions stored on a computer-readable storage medium, the hash table manager including:
a table update component configured to perform updates on a dynamic linear hash table, the updates requested by clients based on request item values;
a table capacity status component configured to determine first capacity indicators associated with the dynamic linear hash table, based on results of the update requests; and
a table maintenance component configured to initiate lock-free merges and lock-free splits of hash table buckets associated with the dynamic linear hash table, based on initiating lock-free merges and lock-free splits of linked lists included in hash table buckets associated with the dynamic linear hash table, based on the determined first capacity indicators, the linked lists including hashed items stored in the dynamic linear hash table, and based on initiating one or more atomic operations to set values of variables that store a current respective state of respective ones of the hash table buckets associated with the dynamic linear hash table.

2. The system of claim 1, wherein:
the lock-free merges and lock-free splits of hash table buckets are based on an accessibility status that includes simultaneous access to each one of the hash table buckets for a plurality of processing units, wherein non-suspended ones of the processing units continue processing of a first set of execution tasks during temporal intervals when one or more suspended ones of the processing units suspend processing operations associated with the suspended ones of the processing units.

3. The system of claim 1, wherein:
the linked lists included in the hash table buckets associated with the dynamic linear hash table are ordered based on a reverse-split ordering of hash key values associated with respective nodes of the linked lists included in the hash table buckets, and
the dynamic linear hash table includes a linearly expanding and linearly contracting dynamic linear hash table.

4. The system of claim 1, further comprising:
a bucket merging component configured to initiate lock-free merges of a first portion of the hash table buckets, based on state-setting atomic operations that set states of objects associated with the dynamic linear hash table, and other merging operations that respect the set states of the objects associated with the dynamic linear hash table.

5. The system of claim 4, wherein:
the state-setting atomic operations that set the states of the objects associated with the dynamic linear hash table include at least one compare and swap (CAS) operation or at least one test and set (TS) operation.

6. The system of claim 4, wherein:
the bucket merging component is configured to initiate the lock-free merges of the first portion of the hash table buckets based on one or more atomic operations that set status indicators associated with respective hash table buckets included in the first portion of the hash table buckets.

7. The system of claim 1, further comprising:
a bucket splitting component configured to initiate lock-free splits of a second portion of the hash table buckets, based on state-setting atomic operations that set states of objects associated with the dynamic linear hash table, and other splitting operations that respect the set states of the objects associated with the dynamic linear hash table.

8. The system of claim 7, wherein:
the bucket splitting component is configured to initiate the lock-free splits of the second portion of the hash table buckets based on one or more atomic operations to set status indicators associated with respective hash table buckets included in the second portion of the hash table buckets.

9. The system of claim 1, further comprising:
a directory component configured to determine a location of one of the hash table buckets, based on one of the update requests and a first hash function, based on accessing a hash table directory associated with the dynamic linear hash table, the hash table directory including location indicators associated with segments, the segments including location indicators associated with respective ones of the hash table buckets that are associated with the dynamic linear hash table.

10. The system of claim 9, wherein:
the hash table manager is configured to perform additions and deletions of segments associated with the hash table directory, based on status indicators associated with the respective segments.

11. The system of claim 10, further comprising:
a segment allocation component configured to request storage for added segments based on an exponential size increase for each newly added segment after a first and second segment addition.

12. The system of claim 1, wherein:
the update requests include one or more of:
an update request for adding a first item to the dynamic linear hash table, or
an update request for removing a second item from the dynamic linear hash table.

13. The system of claim 12, wherein:
the update request for adding the first item to the dynamic linear hash table is based on a query request to locate the first item in the dynamic linear hash table.

14. The system of claim 12, further comprising:

an item insertion component configured to add the first item to the dynamic linear hash table via lock-free insertion of an added hashed item to a first one of the linked lists, based on reverse-split ordering associated with nodes of the first one of the linked lists, and an item deletion component configured to remove the second item from the dynamic linear hash table via lock-free deletion of a deletion hashed item from a second one of the linked lists, based on reverse-split ordering associated with nodes of the second one of the linked lists.

15. The system of claim 1, wherein:

the table capacity status component is configured to determine one of the first capacity indicators associated with the dynamic linear hash table, based on a load factor associated with the dynamic linear hash table, the load factor indicating a value representing a number of items stored in the dynamic linear hash table divided by a current number of the hash table buckets.

16. A method comprising:

receiving a request for a lock-free merge of a first hash table bucket and a second hash table bucket associated with a dynamic linear hash table, the first and second hash table buckets including respective first and second location indicators associated with respective first and second linked lists ordered based on a reverse-split ordering of hash key values associated with respective nodes of the respective first and second linked lists; and initiating the lock-free merge of the first hash table bucket and the second hash table bucket, via one or more device processors, based on initiating one or more atomic operations to set status indicators associated with the first and second hash table buckets, the one or more atomic operations to set status indicators associated with the first and second hash table buckets including one or more atomic operations to set values of variables that store a current respective state of the first and second hash table buckets.

17. The method of claim 16, further comprising:

receiving a request for a lock-free split of a third hash table bucket associated with the dynamic linear hash table, the third hash table bucket including a third location indicator associated with a third linked list ordered based on a reverse-split ordering of hash key values associated with respective nodes of the third linked list; and initiating the lock-free split of the third hash table bucket based on:
  initiating one or more atomic operations to set status indicators associated with the third hash table bucket,
  initiating a traversal of the third linked list to a split point node that includes an item having a reverse-bit hash key value that includes a bit configuration that includes a bucket splitting bit position bit value set to a predetermined splitting indicator, based on reverse-bit ordering of hash key values in the third linked list, and
  initiating an update to a hash table directory segment to indicate a location of the split point node as a location of a fourth linked list associated with a new hash table bucket.

18. The method of claim 17, further comprising:

receiving a request for lock-free splits of a first plurality of hash table buckets associated with the dynamic linear hash table other than the third hash table bucket, the plurality of hash table buckets including respective location indicators associated with a respective first plurality of linked lists ordered based on a reverse-split ordering of hash key values associated with respective nodes of the first plurality of hash table buckets; and initiating the lock-free splits of the first plurality of hash table buckets in parallel with the lock-free split of the third hash table bucket.

19. A computer program product tangibly embodied on a computer-readable storage device and including executable code that causes at least one data processing apparatus to:

receive a request to modify a current capacity of a dynamic lock-free linear hash table, the dynamic lock-free linear hash table including a plurality hashed items stored in linked lists included in hash table buckets associated with the dynamic lock-free linear hash table, the hash table buckets ordered based on a reverse-split ordering of hash key values associated with respective nodes of the linked lists included in the hash table buckets; and initiate a modification event, the modification event including initiating a modification of the current capacity based on initiating a plurality of atomic operations in parallel, to set status indicators associated with respective hash table buckets included in the plurality of hash table buckets, the plurality of atomic operations to set status indicators associated with the respective hash table buckets including a plurality of atomic operations to set values of variables that store a current respective state of the respective hash table buckets.

20. The computer program product of claim 19, wherein:

the modification event includes at least one of:
  initiating a plurality of merges of pairs of hash table buckets included in the plurality of hash table buckets, in parallel, or
  initiating a plurality of splits of respective ones of the plurality of hash table buckets, in parallel.

* * * * *